(12) United States Patent
Hasegawa et al.

(10) Patent No.: US 12,720,215 B2
(45) **Date of Patent: *Aug. 25, 2026**

(54) IMAGING APPARATUS, OPERATION METHOD OF IMAGING APPARATUS, PROGRAM, AND IMAGING SYSTEM

(71) Applicant: FUJIFILM CORPORATION, Tokyo (JP)

(72) Inventors: Ryo Hasegawa, Saitama (JP); Tomoyuki Kawai, Saitama (JP); Makoto Kobayashi, Saitama (JP); Hitoshi Sakurabu, Saitama (JP); Kazufumi Sugawara, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 47 days.

This patent is subject to a terminal disclaimer.

(21) Appl. No.: 18/632,793

(22) Filed: Apr. 11, 2024

(65) Prior Publication Data

US 2024/0259700 A1 Aug. 1, 2024

Related U.S. Application Data

(63) Continuation of application No. 17/805,232, filed on Jun. 3, 2022, now Pat. No. 11,991,461, which is a (Continued)

(30) Foreign Application Priority Data

Dec. 19, 2019 (JP) ................................ 2019-229629

(51) Int. Cl.
*H04N 23/951* (2023.01)
*G06T 7/70* (2017.01)
(Continued)

(52) U.S. Cl.
CPC ............ *H04N 23/951* (2023.01); *G06T 7/70* (2017.01); *G06V 10/22* (2022.01); *H04N 23/61* (2023.01); *H04N 23/635* (2023.01); *H04N 25/44* (2023.01)

(58) Field of Classification Search
CPC .... H04N 23/951; H04N 23/61; H04N 23/635; H04N 25/44; H04N 5/2628; H04N 23/90;
(Continued)

(56) References Cited

U.S. PATENT DOCUMENTS 5,444,550 A * 8/1995 Enokida .................. H04N 1/38 358/448
8,120,675 B2 * 2/2012 Tojima .......... H04N 21/234327 386/326
(Continued)

FOREIGN PATENT DOCUMENTS

CN 106791856 A 5/2017
JP 2014-178603 A 9/2014
(Continued)

OTHER PUBLICATIONS

International Search Report issued in International Application No. PCT/JP2020/044751 on Feb. 22, 2021.
(Continued)

*Primary Examiner* — Albert H Cutler
(74) *Attorney, Agent, or Firm* — SOLARIS Intellectual Property Group, PLLC

(57) ABSTRACT

An imaging apparatus includes an imaging element and a second processor. The imaging element incorporates a memory which stores image data obtained by imaging at a first frame rate, and a first processor configured to output the image data at a second frame rate independent of the first frame rate. The image data is input into the second processor from the first processor. The first processor is configured to
(Continued)

acquire positional information indicating a position of an image recognition region set as a processing target of image recognition processing in the image data. The second processor is configured to perform the image recognition processing on the image recognition region based on the positional information.

12 Claims, 21 Drawing Sheets

Related U.S. Application Data continuation of application No. PCT/JP2020/044751, filed on Dec. 1, 2020.

(51) Int. Cl.
*G06V 10/22* (2022.01)
*H04N 23/61* (2023.01)
*H04N 23/63* (2023.01)
*H04N 25/44* (2023.01)

(58) Field of Classification Search
CPC ........ H04N 25/70; H04N 5/262; H04N 23/50; H04N 25/40; G06T 7/70; G06T 7/254; G06T 2207/10016; G06T 2207/10024; G06T 2207/30232; G06T 7/215; G06V 10/22
See application file for complete search history.

(56) References Cited

U.S. PATENT DOCUMENTS 10,540,565 B2* 1/2020 Niikura .................. H04N 23/90
11,991,461 B2* 5/2024 Hasegawa ............ H04N 23/951
2005/0093886 A1* 5/2005 Kubota ................ H04N 1/3872 345/619
2010/0283864 A1* 11/2010 Kawai ....................... G06T 1/00 348/222.1
2013/0215290 A1 8/2013 Solhusvik et al.
2014/0341474 A1* 11/2014 Dollar ..................... G06T 7/246 382/197
2015/0189214 A1* 7/2015 Kurose ................... H01L 25/18 250/208.1
2015/0234865 A1 8/2015 Lida
2015/0281590 A1* 10/2015 MacMillan ............ H04N 23/90 348/218.1
2017/0094191 A1* 3/2017 Hashizume ............ H04N 25/42
2018/0239108 A1 8/2018 Ishii et al.
2018/0249090 A1 8/2018 Nakagawa et al.
2019/0149752 A1 5/2019 Takahashi et al.
2019/0332897 A1* 10/2019 Chen ....................... G06T 7/215
2020/0041759 A1 2/2020 Ishii et al.
2021/0264192 A1 8/2021 Eki
2021/0289151 A1 9/2021 Eki
2021/0318515 A1 10/2021 Ishii et al.

FOREIGN PATENT DOCUMENTS

JP 2015-002553 A 1/2015
JP 2015-156054 A 8/2015
JP 2017-055231 A 3/2017
JP 2017-060155 A 3/2017
JP 2017-183952 A 10/2017
JP 2018-078609 A 5/2018
JP 2018-107759 A 7/2018
JP 2020-025265 A 2/2020
WO 2009/040996 A1 4/2009

OTHER PUBLICATIONS

Written Opinion of the ISA issued in International Application No. PCT/JP2020/044751 on Feb. 22, 2021.
English language translation of the following: Office action dated Jan. 17, 2024 from the SIPO in a Chinese patent application No. 202080086746.2 corresponding to the instant patent application.
Non-Final Office Action issued by USPTO on Oct. 25, 2023, in related U.S. Appl. No. 17/805,232.
Notice of Allowance issued by USPTO on Feb. 6, 2024, in related U.S. Appl. No. 17/805,232.
English language translation of the following: Office action dated Feb. 18, 2025 from the JPO in a Japanese patent application No. 2023-147517 corresponding to the instant patent application. This office action translation is submitted now in order to supplement the understanding of the cited references which are being disclosed in the instant Information Disclosure Statement.

* cited by examiner 10
12
14
16
38
40
L1
SW
23
18
20

FIG. 3

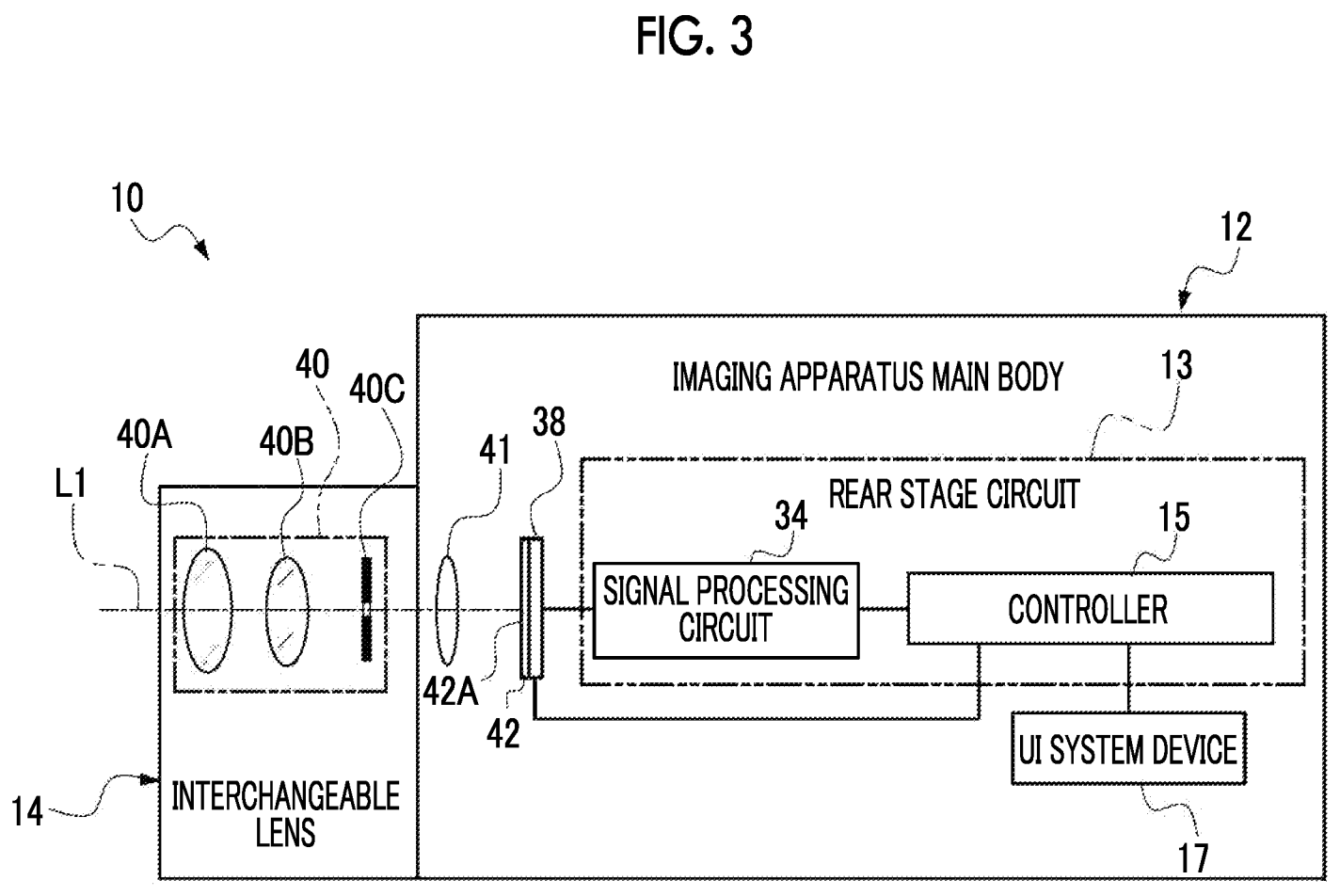

IMAGING APPARATUS MAIN BODY

REAR STAGE CIRCUIT

CONTROLLER

UI SYSTEM DEVICE

SIGNAL PROCESSING CIRCUIT

INTERCHANGEABLE LENS

12
IMAGING APPARATUS MAIN BODY
17
UI SYSTEM DEVICE
24
TOUCH PANEL DISPLAY
26
DISPLAY
28
TOUCH PANEL
84
RECEPTION DEVICE
HARD KEY PORTION
25
104
EXTERNAL I/F
100
15
CONTROLLER
CPU
50
STORAGE
51
MEMORY
52
57A
INPUT I/F
57B
OUTPUT I/F
34
SIGNAL PROCESSING CIRCUIT
IMAGE DATA
IMAGE DATA
IMAGING TIMING SIGNAL
38
42
42A
L1

FIG. 6

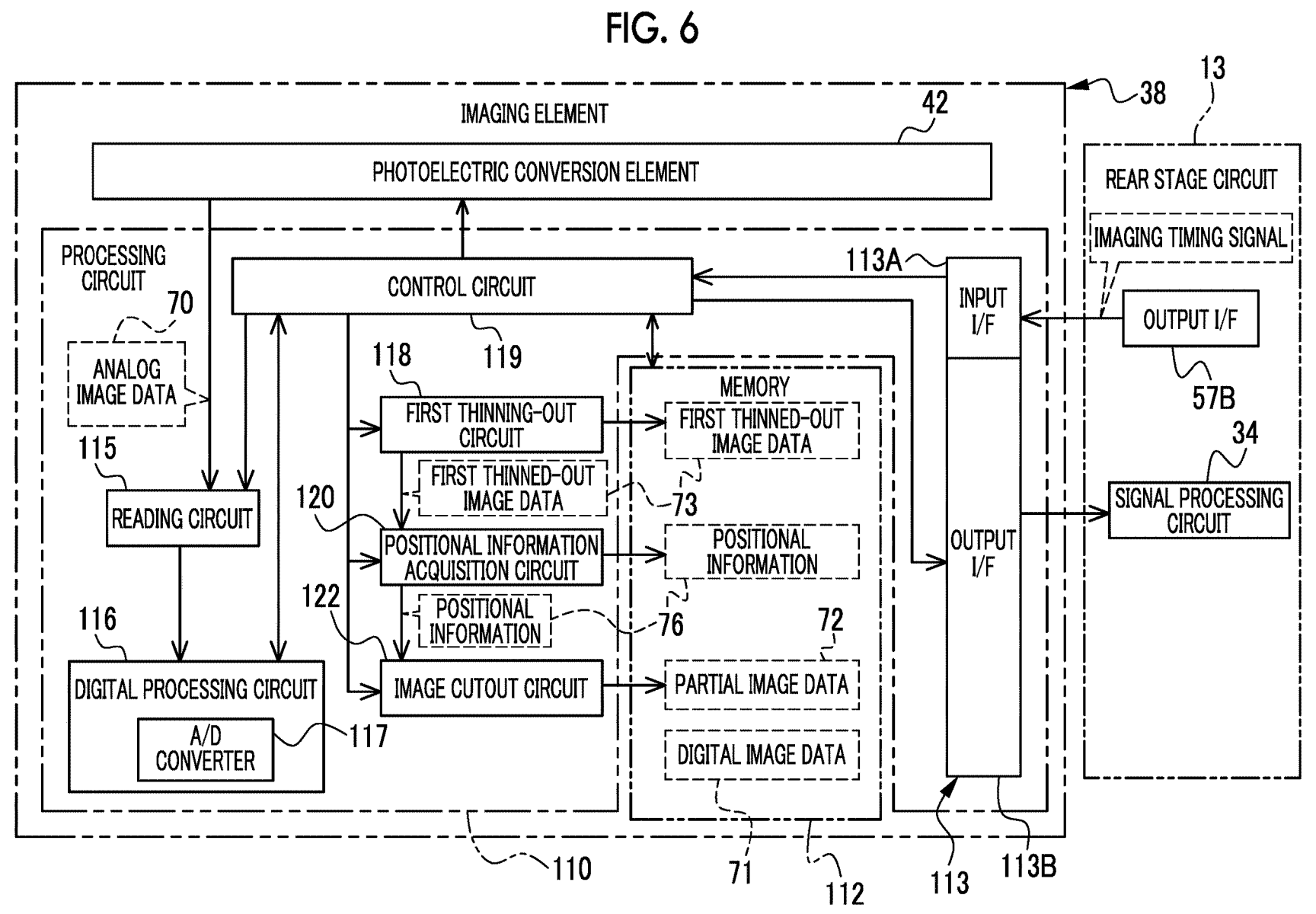

13
REAR STAGE CIRCUIT
IMAGING TIMING SIGNAL
OUTPUT I/F
57B
SIGNAL PROCESSING CIRCUIT
34
38
IMAGING ELEMENT
42
PHOTOELECTRIC CONVERSION ELEMENT
INPUT I/F
OUTPUT I/F
113A
113B
113
CONTROL CIRCUIT
119
MEMORY
FIRST THINNED-OUT IMAGE DATA
73
POSITIONAL INFORMATION
76
72
PARTIAL IMAGE DATA
DIGITAL IMAGE DATA
71
112
FIRST THINNING-OUT CIRCUIT
118
FIRST THINNED-OUT IMAGE DATA
POSITIONAL INFORMATION ACQUISITION CIRCUIT
120
POSITIONAL INFORMATION
IMAGE CUTOUT CIRCUIT
122
110
117
DIGITAL PROCESSING CIRCUIT
A/D CONVERTER
116
READING CIRCUIT
115
ANALOG IMAGE DATA
70
PROCESSING CIRCUIT (FIRST THINNED-OUT FRAME)
73a
(SECOND THINNED-OUT FRAME)
73b
(THIRD THINNED-OUT FRAME)
73c
73d
73e
(X2, Y2)
75
POSITIONAL INFORMATION
76
(X1, Y1)

FIG. 11

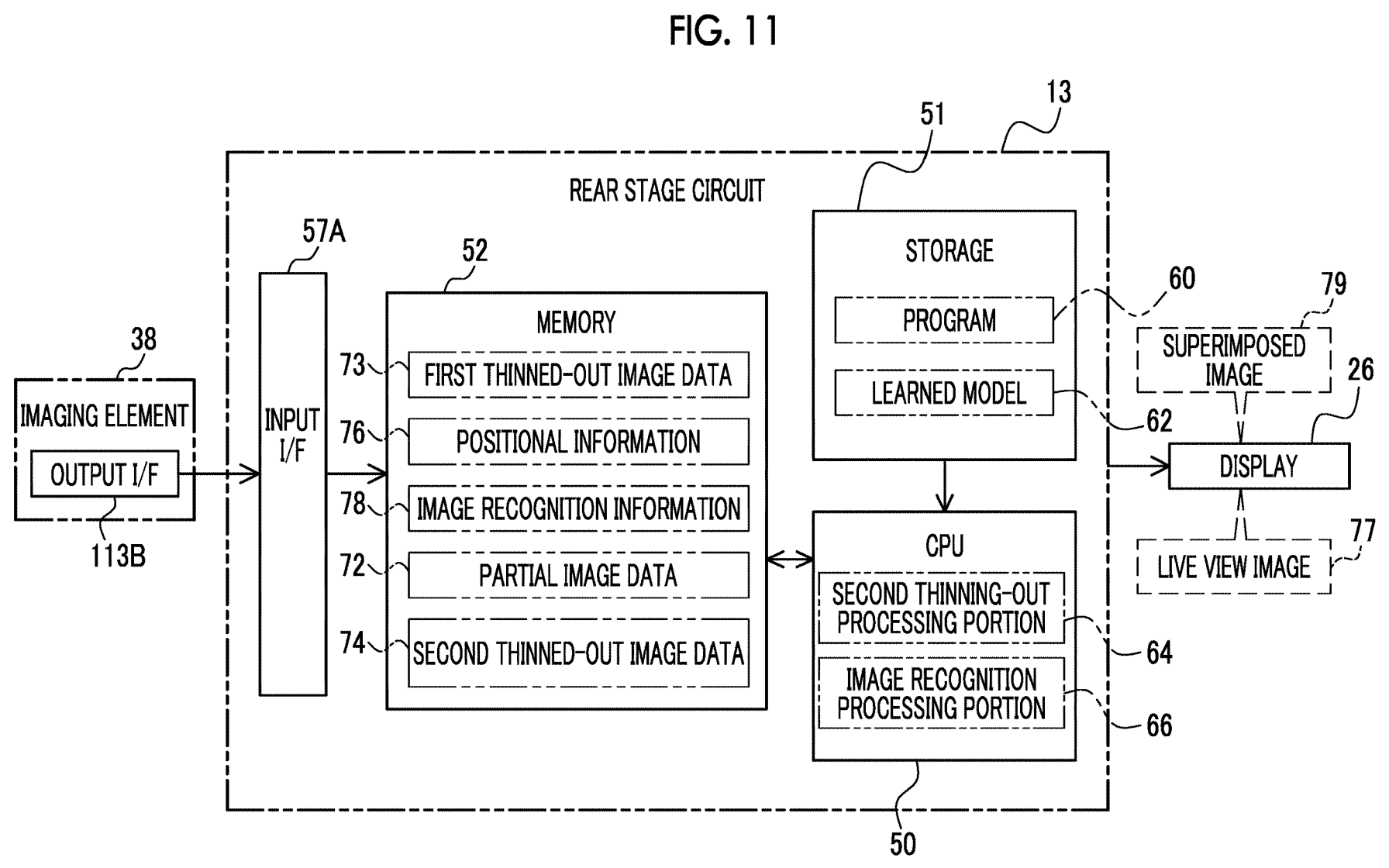

REAR STAGE CIRCUIT
13
STORAGE
51
PROGRAM
60
LEARNED MODEL
62
CPU
50
SECOND THINNING-OUT PROCESSING PORTION
64
IMAGE RECOGNITION PROCESSING PORTION
66
DISPLAY
26
SUPERIMPOSED IMAGE
79
LIVE VIEW IMAGE
77
MEMORY
52
FIRST THINNED-OUT IMAGE DATA
73
POSITIONAL INFORMATION
76
IMAGE RECOGNITION INFORMATION
78
PARTIAL IMAGE DATA
72
SECOND THINNED-OUT IMAGE DATA
74
INPUT I/F
57A
IMAGING ELEMENT
38
OUTPUT I/F
113B (LIVE VIEW IMAGE)

(SUPERIMPOSED IMAGE)

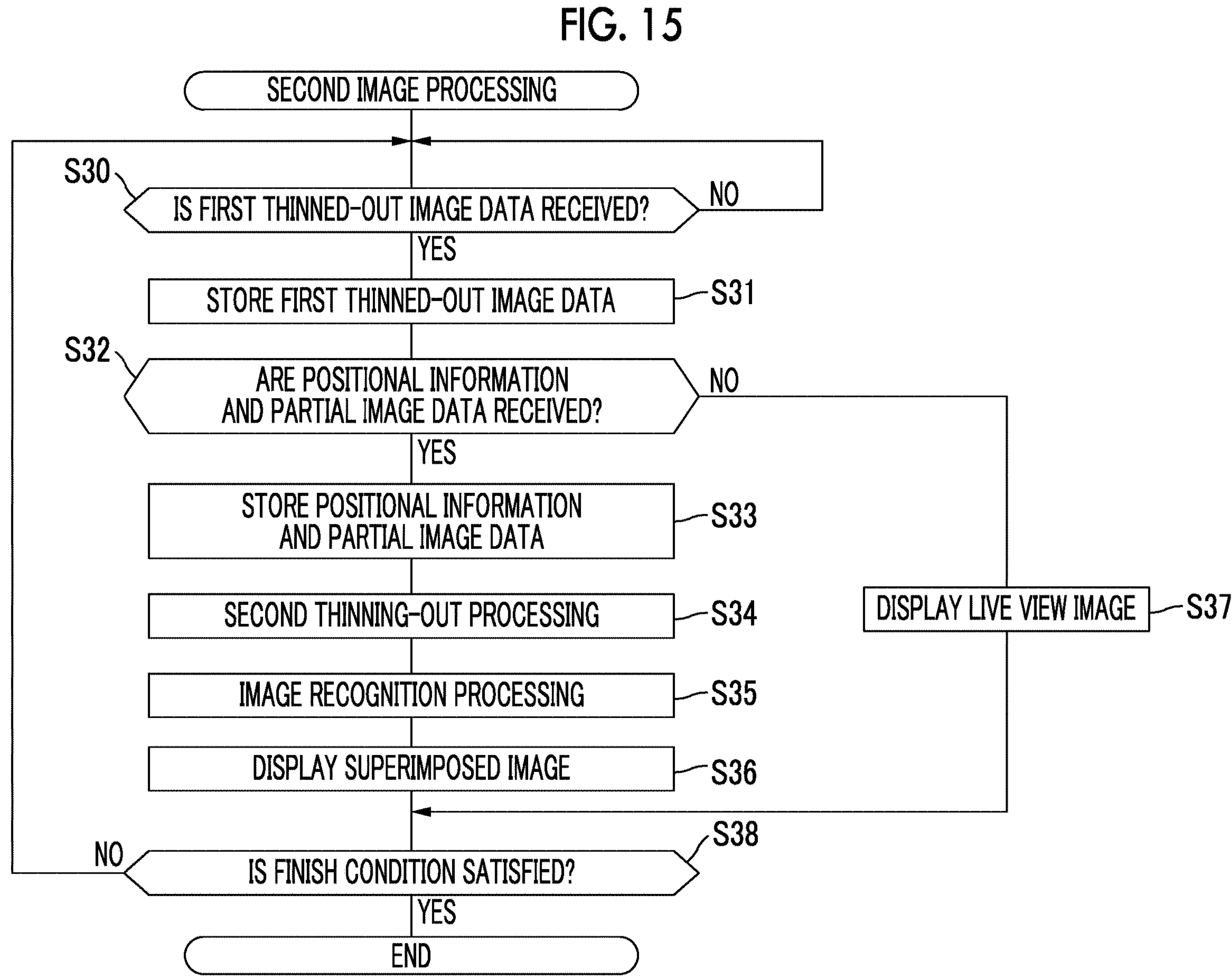
FIG. 15
SECOND IMAGE PROCESSING
S30
IS FIRST THINNED-OUT IMAGE DATA RECEIVED?
NO
YES
STORE FIRST THINNED-OUT IMAGE DATA
S31
S32
ARE POSITIONAL INFORMATION AND PARTIAL IMAGE DATA RECEIVED?
NO
YES
STORE POSITIONAL INFORMATION AND PARTIAL IMAGE DATA
S33
SECOND THINNING-OUT PROCESSING
S34
DISPLAY LIVE VIEW IMAGE
S37
IMAGE RECOGNITION PROCESSING
S35
DISPLAY SUPERIMPOSED IMAGE
S36
S38
NO
IS FINISH CONDITION SATISFIED?
YES
END

FIG. 16

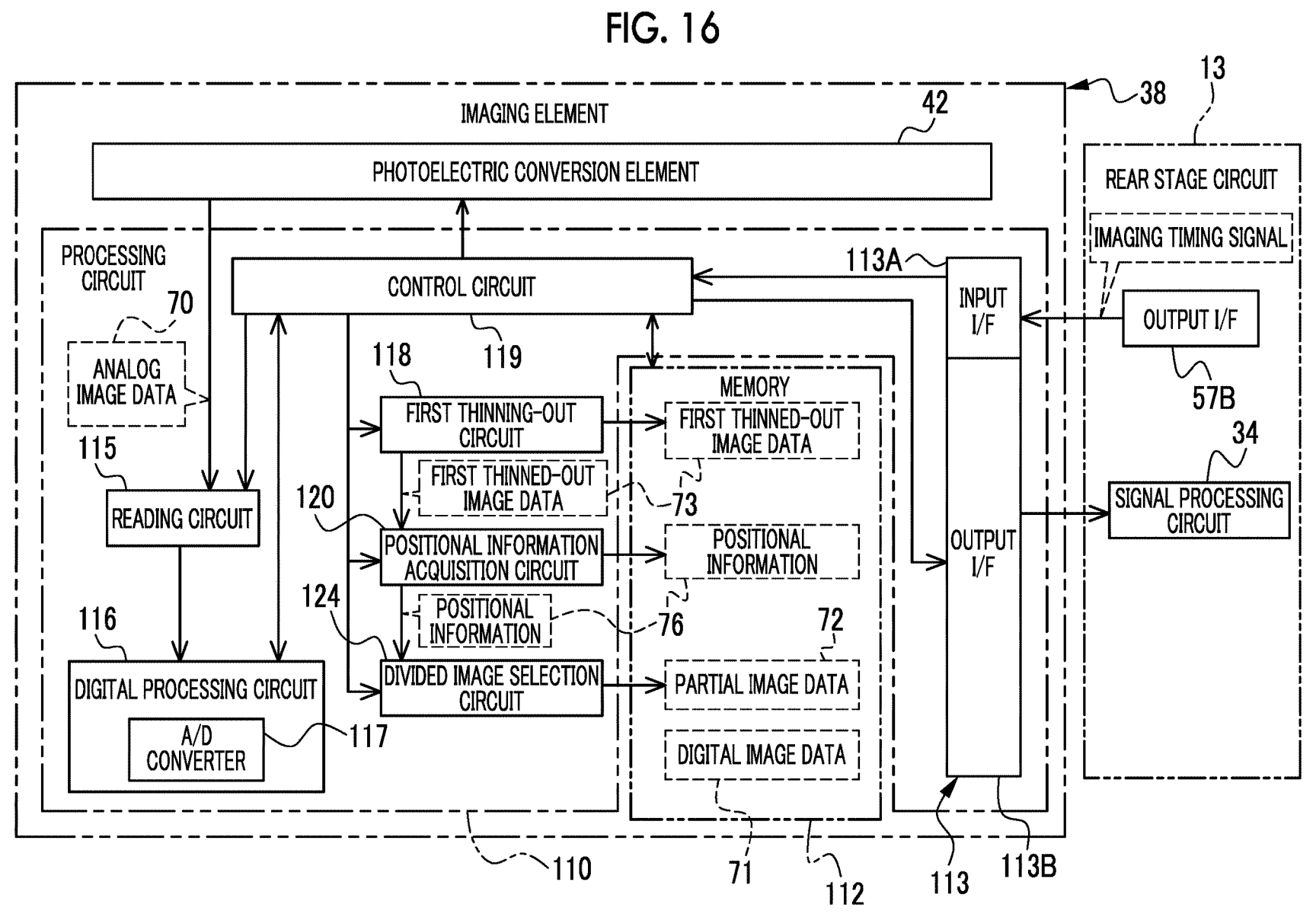

13
REAR STAGE CIRCUIT
IMAGING TIMING SIGNAL
OUTPUT I/F
57B
34
SIGNAL PROCESSING CIRCUIT
38
IMAGING ELEMENT
42
PHOTOELECTRIC CONVERSION ELEMENT
INPUT I/F
OUTPUT I/F
113B
113
113A
MEMORY
FIRST THINNED-OUT IMAGE DATA
POSITIONAL INFORMATION
72
PARTIAL IMAGE DATA
DIGITAL IMAGE DATA
112
71
73
76
CONTROL CIRCUIT
119
FIRST THINNING-OUT CIRCUIT
118
FIRST THINNED-OUT IMAGE DATA
POSITIONAL INFORMATION ACQUISITION CIRCUIT
120
POSITIONAL INFORMATION
DIVIDED IMAGE SELECTION CIRCUIT
124
110
117
DIGITAL PROCESSING CIRCUIT
A/D CONVERTER
116
READING CIRCUIT
115
ANALOG IMAGE DATA
70
PROCESSING CIRCUIT

FIG. 17

274
274
274
274
270
76
POSITIONAL INFORMATION
(X2, Y2)
(X1, Y1)
(PARTIAL IMAGE DATA)
272

FIG. 21

300
STORAGE
PROGRAM
60
INSTALL
13
REAR STAGE CIRCUIT
50
CPU
51
STORAGE
52
MEMORY
100

IMAGING APPARATUS, OPERATION METHOD OF IMAGING APPARATUS, PROGRAM, AND IMAGING SYSTEM

CROSS-REFERENCE TO RELATED APPLICATIONS

This application is a continuation application of, and claims priority to, U.S. application Ser. No. 17/805,232, filed Jun. 3, 2022, which is a continuation application of International Application No. PCT/JP2020/044751, filed Dec. 1, 2020, the disclosures of which are incorporated herein by reference in their entireties. Further, this application claims priority from Japanese Patent Application No. 2019-229629, filed Dec. 19, 2019, the disclosure of which is incorporated herein by reference in its entirety.

BACKGROUND

1. Technical Field

The technology of the present disclosure relates to an imaging apparatus, an operation method of an imaging apparatus, a program, and an imaging system.

2. Related Art

JP2017-055231A discloses an image processing apparatus comprising a main subject specifying portion and a learning portion. The main subject specifying portion specifies, using an image continuously output from an imaging portion that captures a motion picture image as a processing target, a main subject region in which a main subject that is a subject set as a target to be focused in the image is captured. The learning portion learns to recognize a specific region in which a motion of another subject other than the main subject captured in the image is less than or equal to a predetermined magnitude, based on a difference between the image of the processing target and a previous frame image that is a specific image set as the processing target previous to the image.

JP2017-060155A discloses an imaging element comprising a pixel portion, a reading portion, and an output portion. A plurality of pixels that photoelectrically convert light from a subject are arranged in the pixel portion. The reading portion reads out signals from the pixel portion. Among the signals read out by the reading portion, the output portion outputs signals of the pixels of the entire region of the pixel portion to an outside of the imaging element as a signal for generating an image, and outputs signals of pixels of a partial region of the pixel portion to the outside of the imaging element as a signal for calculating an evaluation value to be used for a drive control of an apparatus comprising the imaging element.

JP2018-078609A discloses an imaging element comprising a plurality of unit pixels, an operation processing portion, and a signal output portion. The plurality of unit pixels are arranged in a matrix form, and each of the plurality of unit pixels includes a first photoelectric conversion portion and a second photoelectric conversion portion that convert incident light into electric charges. The operation processing portion performs predetermined operation processing on an A signal based on the electric charges converted by the first photoelectric conversion portion and a B signal based on the electric charges converted by the second photoelectric conversion portion. The signal output portion outputs the signals subjected to the predetermined operation processing by the operation processing portion to an outside.

JP2014-178603A discloses an imaging apparatus comprising an imaging unit, a region-of-interest decision unit, a control unit, and a focal point detection unit. The imaging unit has a plurality of imaging regions and generates image signals corresponding to an image of light incident on the imaging regions. The region-of-interest decision unit decides a region-of-interest of the image indicated by the image signals based on the image signals output from the imaging unit. The control unit includes a first control portion that performs a control for capturing an imaging region on which the image of light corresponding to the region-of-interest is incident among the plurality of imaging regions under a first imaging condition, and a second control portion that performs a control for capturing the imaging regions other than the imaging region on which the image of light corresponding to the region-of-interest is incident among the plurality of imaging regions under a second imaging condition different from the first imaging condition. The focal point detection unit detects a focal point adjustment state of the region-of-interest. In the imaging apparatus, the first control portion is characterized by performing the control for imaging at a higher frame rate than the second control portion.

SUMMARY

One embodiment according to the technology of the present disclosure provides an imaging apparatus, an operation method of an imaging apparatus, a program, and an imaging system for reducing a processing load of an imaging element, compared to a case where image recognition processing is performed on an image recognition region in the imaging element.

A first aspect according to the technology of the present disclosure is an imaging apparatus comprising an imaging element that incorporates a memory which stores image data obtained by imaging at a first frame rate, and a first processor configured to output the image data at a second frame rate independent of the first frame rate, and a second processor configured to receive an input of the image data output from the first processor. The first processor is configured to acquire positional information indicating a position of an image recognition region set as a processing target of image recognition processing in the image data. The second processor is configured to perform the image recognition processing on the image recognition region based on the positional information.

A second aspect according to the technology of the present disclosure is the imaging apparatus according to the first aspect, in which the positional information is coordinates indicating the position of the image recognition region in the image data.

A third aspect according to the technology of the present disclosure is the imaging apparatus according to the first or second aspect, in which the first processor is configured to detect the image recognition region from the image data based on a difference between frames of the image data and acquire the positional information based on a detection result.

A fourth aspect according to the technology of the present disclosure is the imaging apparatus according to any one of the first to third aspects, in which the first processor is configured to output partial image data that is a part of the image data, and the positional information at the second frame rate, and the partial image data includes the image recognition region.

A fifth aspect according to the technology of the present disclosure is the imaging apparatus according to the fourth aspect, in which the partial image data includes only the image recognition region.

A sixth aspect according to the technology of the present disclosure is the imaging apparatus according to the fourth or fifth aspect, in which the first processor is configured to output thinned-out image data obtained by thinning out the image data, the partial image data, and the positional information at the second frame rate.

A seventh aspect according to the technology of the present disclosure is the imaging apparatus according to any one of the first to sixth aspects, in which the positional information is information obtained from a detection result of the image recognition region by the first processor with respect to first thinned-out image data obtained by thinning out the image data at a first thinning-out rate.

An eighth aspect according to the technology of the present disclosure is the imaging apparatus according to the seventh aspect, in which the second processor is configured to display an image indicated by the first thinned-out image data on a display as a display motion picture image.

A ninth aspect according to the technology of the present disclosure is the imaging apparatus according to any one of the fourth to sixth aspects, in which the second processor is configured to perform the image recognition processing on second thinned-out image data obtained by thinning out the image data or the partial image data at a second thinning-out rate.

A tenth aspect according to the technology of the present disclosure is the imaging apparatus according to the ninth aspect, in which a first thinning-out rate at which the image data is thinned out, and the second thinning-out rate are different.

An eleventh aspect according to the technology of the present disclosure is the imaging apparatus according to the tenth aspect, in which the second thinning-out rate is lower than the first thinning-out rate.

A twelfth aspect according to the technology of the present disclosure is the imaging apparatus according to the first or second aspect, in which the first processor is configured to output partial image data that is a part of the image data, and the positional information at a third frame rate different from the second frame rate, an image indicated by the partial image data includes the image recognition region, and the third frame rate is decided in accordance with a processing speed of the second processor.

A thirteenth aspect according to the technology of the present disclosure is the imaging apparatus according to the first or second aspect, in which the first processor is configured to create combined image data of one frame by combining image data of a plurality of frames obtained at the first frame rate, and the positional information is information obtained from a detection result of the image recognition region by the first processor with respect to an image indicated by the combined image data.

A fourteenth aspect according to the technology of the present disclosure is the imaging apparatus according to any one of the first to thirteenth aspects, in which the imaging element is an imaging element in which at least a photoelectric conversion element and the memory are formed in one chip.

A fifteenth aspect according to the technology of the present disclosure is the imaging apparatus according to the fourteenth aspect, in which the imaging element is a laminated imaging element in which the photoelectric conversion element and the memory are laminated.

A sixteenth aspect according to the technology of the present disclosure is an operation method of an imaging apparatus including an imaging element that incorporates a memory which stores image data obtained by imaging at a first frame rate, and a first processor configured to output the image data at a second frame rate independent of the first frame rate, and a second processor configured to receive an input of the image data output from the first processor, the operation method comprising acquiring, by the first processor, positional information indicating a position of an image recognition region set as a processing target of image recognition processing in the image data, and performing, by the second processor, the image recognition processing on the image recognition region based on the positional information.

A seventeenth aspect according to the technology of the present disclosure is a program causing a computer to execute a process, the computer being applied to an imaging apparatus including an imaging element that incorporates a memory which stores image data obtained by imaging at a first frame rate, and a first processor configured to output the image data at a second frame rate independent of the first frame rate, and a second processor configured to receive an input of the image data output from the first processor, the process comprising acquiring, by the first processor, positional information indicating a position of an image recognition region set as a processing target of image recognition processing in the image data, and performing, by the second processor, the image recognition processing on the image recognition region based on the positional information.

An eighteenth aspect according to the technology of the present disclosure is an imaging system comprising a plurality of imaging apparatuses each including a photoelectric conversion element which captures an imaging region, a memory which stores image data obtained by imaging performed by the photoelectric conversion element, and a processor configured to output the image data, and a host computer that is disposed on a rear stage of each of the plurality of imaging apparatuses and receives an input of the image data from the processor, in which the processor is configured to acquire positional information indicating a position of an image recognition region set as a processing target of image recognition processing in an image indicated by the image data, and the host computer performs the image recognition processing on the image recognition region based on the positional information.

BRIEF DESCRIPTION OF THE DRAWINGS

Exemplary embodiments of the technology of the disclosure will be described in detail based on the following figures, wherein:

FIG. 3 is a block diagram illustrating an example of a configuration of the imaging apparatus according to the first to fourth embodiments;

FIG. 4 is a block diagram illustrating an example of a hardware configuration of an electric system of an imaging apparatus main body included in the imaging apparatus according to the first to fourth embodiments;

FIG. 6 is a block diagram illustrating an example of a hardware configuration of an electric system of the imaging element included in the imaging apparatus according to the first embodiment;

FIG. 11 is a block diagram illustrating an example of a configuration of a rear stage circuit according to the first to fourth embodiments;

FIG. 15 is a flowchart illustrating an example of a flow of second image processing according to the first embodiment;

FIG. 16 is a block diagram illustrating an example of a hardware configuration of an electric system of the imaging element included in the imaging apparatus according to the second embodiment;

FIG. 17 is a conceptual diagram illustrating an example of partial image data according to the second embodiment;

FIG. 21 is a conceptual diagram illustrating an example of an aspect in which a program is installed on a computer in the rear stage circuit from a storage medium storing the program.

DETAILED DESCRIPTION

Hereinafter, an example of embodiments of an imaging apparatus according to the embodiment of the technology of the present disclosure will be described in accordance with the appended drawings.

First, words used in the following description will be described.

The abbreviation CPU stands for "Central Processing Unit". The abbreviation GPU stands for "Graphics Processing Unit". The abbreviation RAM stands for "Random Access Memory". The abbreviation ROM stands for "Read Only Memory". The abbreviation DRAM stands for "Dynamic Random Access Memory". The abbreviation SRAM stands for "Static Random Access Memory". The abbreviation LSI stands for "Large-Scale Integration".

The abbreviation ASIC stands for "Application Specific Integrated Circuit". The abbreviation PLD stands for "Programmable Logic Device". The abbreviation FPGA stands for "Field-Programmable Gate Array". The abbreviation SoC stands for "System-on-a-chip". The abbreviation SSD stands for "Solid State Drive". The abbreviation USB stands for "Universal Serial Bus". The abbreviation HDD stands for "Hard Disk Drive". The abbreviation EEPROM stands for "Electrically Erasable and Programmable Read Only Memory". The abbreviation CCD stands for "Charge Coupled Device". The abbreviation CMOS stands for "Complementary Metal Oxide Semiconductor". The abbreviation EL stands for "Electro-Luminescence". The abbreviation A/D stands for "Analog/Digital". The abbreviation I/F stands for "Interface". The abbreviation UI stands for "User Interface". The abbreviation LVDS stands for "Low Voltage Differential Signaling". The abbreviation PCIe (registered trademark) stands for "Peripheral Component Interconnect Express". The abbreviation SATA stands for "Serial Advanced Technology Attachment". The abbreviation SLVS-EC stands for "Scalable Low Voltage Signaling with Embedded Clock". The abbreviation MIPI (registered trademark) stands for "Mobile Industry Processor Interface". The abbreviation HDMI (registered trademark) stands for "High-Definition Multimedia Interface". The abbreviation fps stands for "frame per second".

In the following description, for example, "detecting a subject" means detecting subject image data indicating the subject. In addition, for example, "recognizing the subject" means recognizing the subject image data.

First Embodiment

Figure 1:
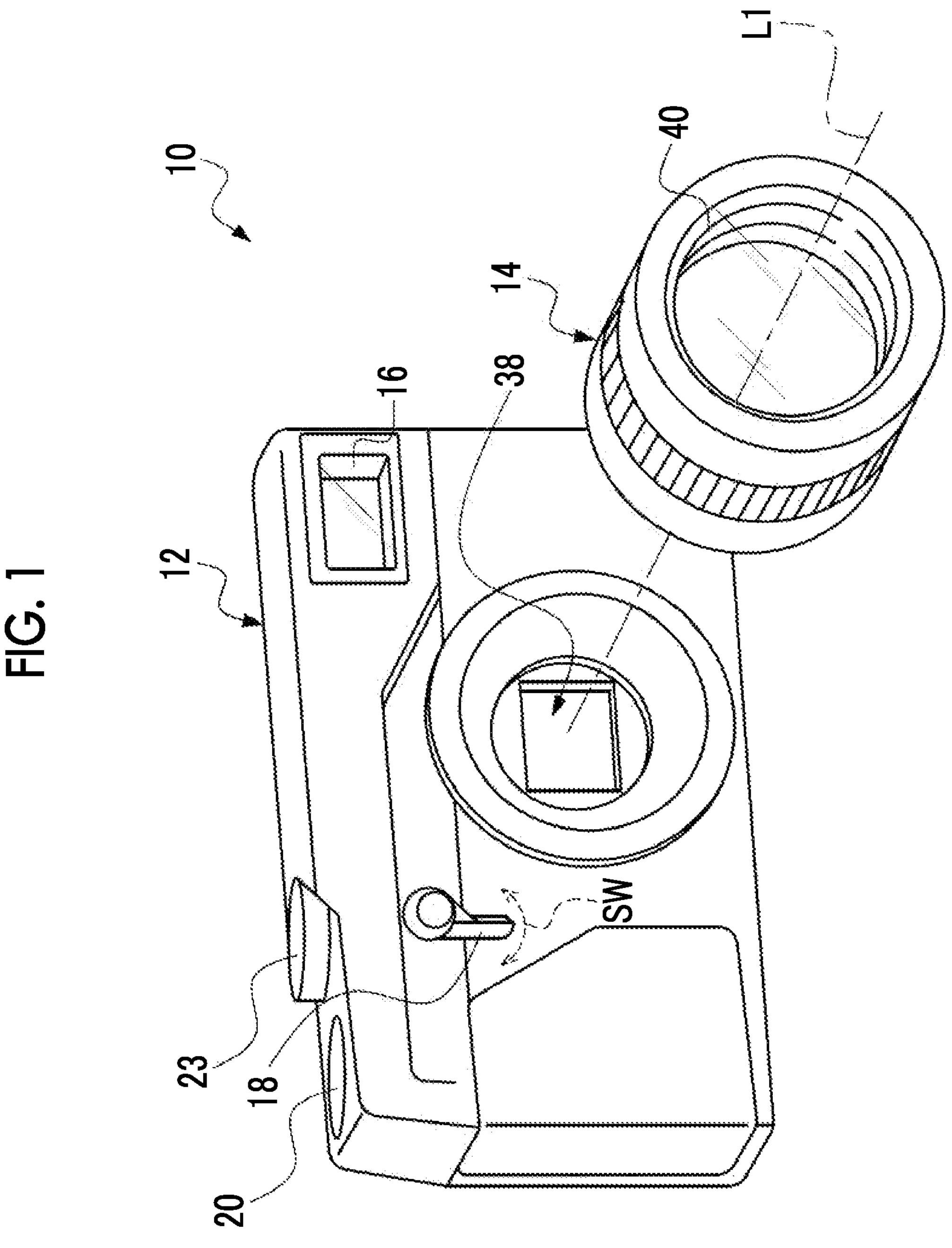
FIG. 1 is a perspective view illustrating an example of an exterior of an imaging apparatus according to first to fourth embodiments.

As illustrated in FIG. 1 as an example, an imaging apparatus 10 is a digital camera of an interchangeable lens type that does not include a reflex mirror. The imaging apparatus 10 comprises an imaging apparatus main body 12 and an interchangeable lens 14 that is interchangeably mounted on the imaging apparatus main body 12. Here, while the digital camera of the interchangeable lens type that does not include the reflex mirror is exemplified as an example of the imaging apparatus 10, the technology of the present disclosure is not limited thereto. The imaging apparatus 10 may be a digital camera of other types such as a fixed lens digital camera.

An imaging element 38 is disposed in the imaging apparatus main body 12. In a case where the interchangeable lens 14 is mounted on the imaging apparatus main body 12, subject light that shows a subject is transmitted through the interchangeable lens 14, and an image of the subject light is formed on the imaging element 38. Image data (for example, refer to FIG. 9 and FIG. 10) that indicates an image of the subject is generated by the imaging element 38.

A hybrid finder (registered trademark) 16 is disposed in the imaging apparatus main body 12. For example, the hybrid finder 16 here refers to a finder in which an optical viewfinder (hereinafter, referred to as the OVF) and an electronic viewfinder (hereinafter, referred to as the EVF) are selectively used. The abbreviation OVF stands for "optical viewfinder". The abbreviation EVF stands for "electronic viewfinder".

A finder switching lever 18 is disposed on a front surface of the imaging apparatus main body 12. An optical image visible by the OVF and a live view image that is an electronic image visible by the EVF are switched by rotationally moving the finder switching lever 18 in a direction of arrow SW. The "live view image" here refers to a display motion picture image based on the image data obtained by imaging using the imaging element 38. The live view image is generally referred to as a live preview image. A release button 20 and a dial 23 are disposed on an upper surface of the imaging apparatus main body 12. The dial 23 operates in a case of setting an operation mode of an imaging system, an operation mode of a playback system, and the like. Accordingly, an imaging mode and a playback mode are selectively set as an operation mode in the imaging apparatus 10.

The release button 20 functions as an imaging preparation instruction portion and an imaging instruction portion, and a push operation of two steps of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) exceeding the intermediate position. Hereinafter, the "state where a push is performed to the half push position from the standby position" will be referred to as a "half push state", and the "state where a push is performed to the full push position from the standby position" will be referred to as a "full push state".

Figure 2:
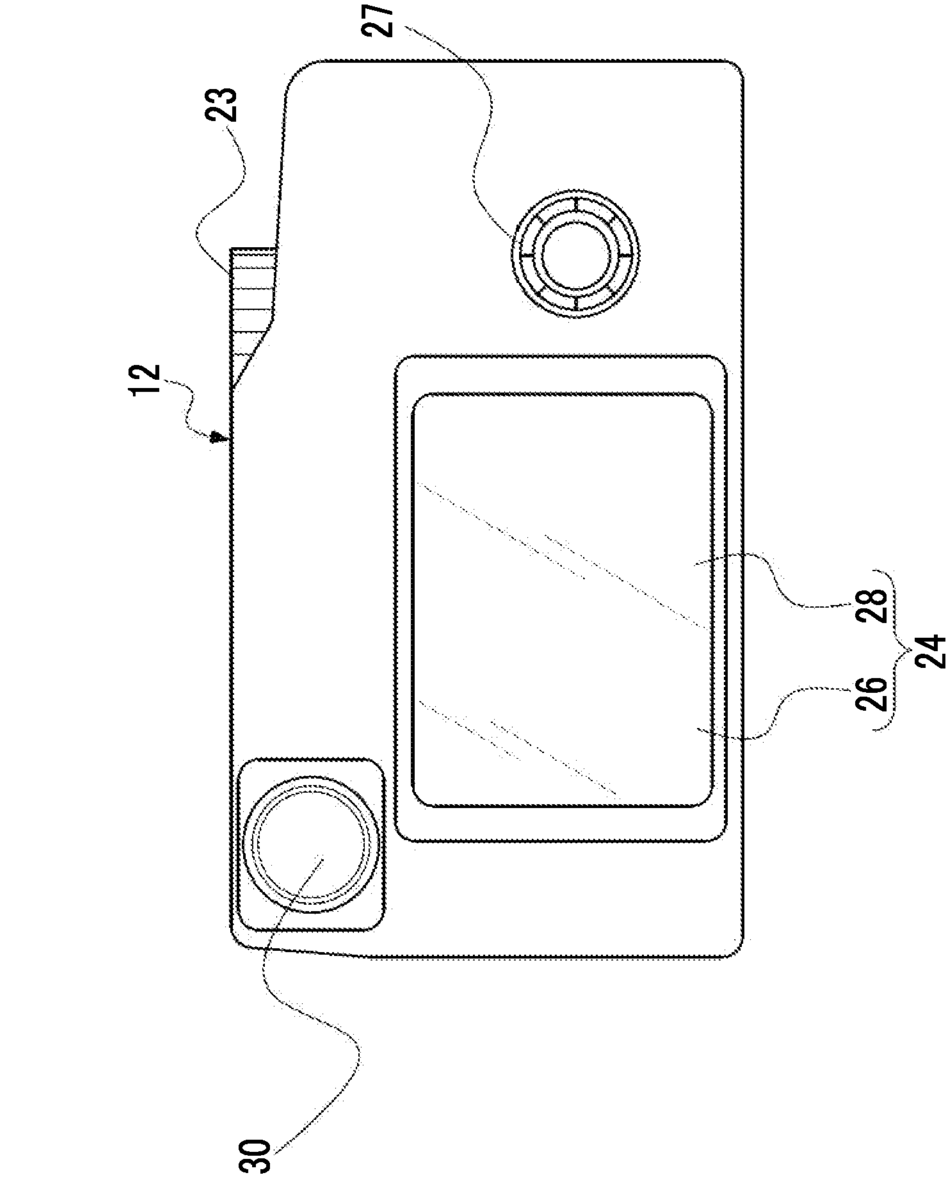
FIG. 2 is a rear view illustrating an example of the exterior on a rear surface side of the imaging apparatus illustrated in FIG. 1.

As illustrated in FIG. 2 as an example, a touch panel display 24, an instruction key 27, and a finder eyepiece portion 30 are disposed on a rear surface of the imaging apparatus main body 12.

Figure 4:
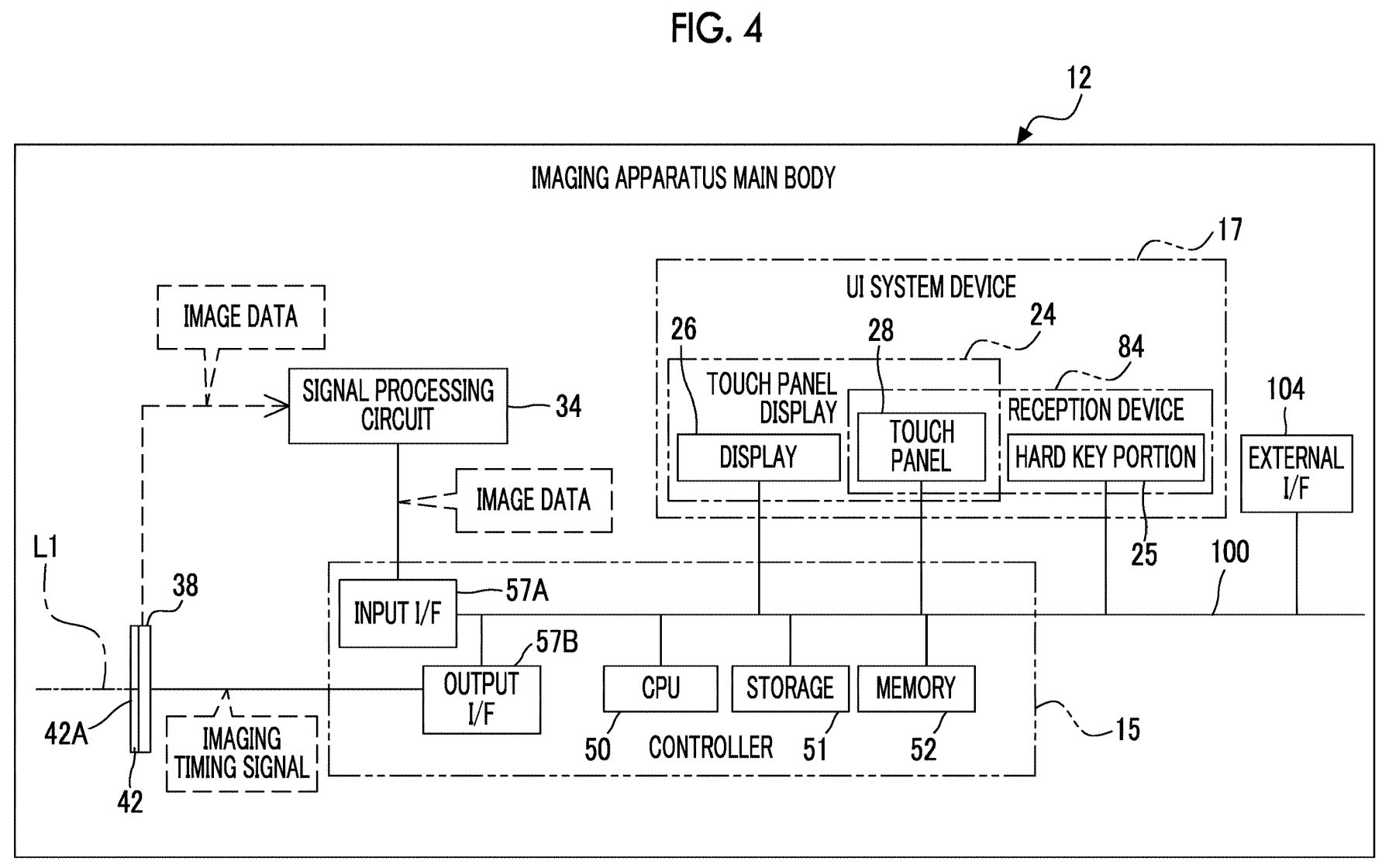

The touch panel display 24 comprises a display 26 and a touch panel 28 (refer to FIG. 4). An organic EL display is exemplified as an example of the display 26. Instead of the organic EL display, the display 26 may be a display of other types such as a liquid crystal display.

Display of the EVF is equivalent to display of the display 26 and thus, will not be described below. However, in the present specification, display on the display 26 can be substituted with display on the EVF.

The display 26 displays images, text information, and the like. The display 26 is used for displaying the live view image obtained by continuous imaging in a case where the imaging apparatus 10 is in the imaging mode. In addition, the display 26 is used for displaying a superimposed image obtained by superimposing a result of image recognition processing, described later, on the live view image. In addition, the display 26 is used for displaying a still picture image obtained by imaging in a case where an imaging instruction for the still picture image is provided. Furthermore, the display 26 is used for displaying a playback image and displaying a menu screen and the like in a case where the imaging apparatus 10 is in the playback mode.

The touch panel 28 is a transmissive touch panel and is overlaid on a surface of a display region of the display 26. The touch panel 28 receives an instruction from a user by detecting a contact of an instruction object such as a finger or a stylus pen.

Here, while an out-cell touch panel display in which the touch panel 28 is overlaid on the surface of the display region of the display 26 is exemplified as an example of the touch panel display 24, the out-cell touch panel display is merely an example. For example, an on-cell or in-cell touch panel display can also be applied as the touch panel display 24.

The instruction key 27 receives various instructions. For example, the "various instructions" here refer to various instructions such as an instruction to display a menu screen on which various menus can be selected, an instruction to select one or a plurality of menus, an instruction to confirm a selected content, an instruction to delete the selected content, zoom in, zoom out, and frame advance.

As illustrated in FIG. 3 as an example, the interchangeable lens 14 includes an imaging lens 40. The imaging lens 40 comprises an objective lens 40A, a focus lens 40B, and a stop 40C. The objective lens 40A, the focus lens 40B, and the stop 40C are arranged in an order of the objective lens 40A, the focus lens 40B, and the stop 40C along an optical axis L1 from a subject side (object side) to an imaging apparatus main body 12 side (image side). The focus lens 40B and the stop 40C operate by receiving motive power from a driving source (not illustrated) such as a motor. That is, the focus lens 40B moves along the optical axis L1 in response to the provided motive power. In addition, the stop 40C adjusts exposure by operating in response to the provided motive power.

The imaging apparatus main body 12 comprises a rear stage circuit 13, a UI system device 17, a mechanical shutter 41, and the imaging element 38. The rear stage circuit 13 is a circuit positioned on a rear stage of the imaging element 38. The rear stage circuit 13 includes a controller 15 and a signal processing circuit 34. The controller 15 is connected to the UI system device 17, the signal processing circuit 34, and the imaging element 38 and controls the entire electric system of the imaging apparatus 10. The rear stage circuit 13 is an example of a "second processor" according to the embodiments of the technology of the present disclosure.

The imaging element 38 comprises a photoelectric conversion element 42 having a light receiving surface 42A. In the present embodiment, the imaging element 38 is a CMOS image sensor. In addition, while the CMOS image sensor is illustrated here as the imaging element 38, the technology of the present disclosure is not limited thereto. For example, the technology of the present disclosure is also established in a case where the imaging element 38 is an image sensor of other types such as a CCD image sensor.

The mechanical shutter 41 operates by receiving motive power from a driving source (not illustrated) such as a motor. In a case where the interchangeable lens 14 is mounted on the imaging apparatus main body 12, the subject light showing the subject is transmitted through the imaging lens 40, and the image of the subject light is formed on the light receiving surface 42A through the mechanical shutter 41.

The UI system device 17 is a device that provides information to the user or receives the instruction from the user. The controller 15 acquires various types of information from the UI system device 17 and controls the UI system device 17.

The imaging element 38 is connected to the controller 15 and generates the image data indicating the image of the subject by imaging the subject under control of the controller 15.

The imaging element 38 is connected to the signal processing circuit 34. The signal processing circuit 34 is an LSI, specifically, a device including an ASIC and an FPGA. The controller 15 acquires various types of information from the signal processing circuit 34 and controls the imaging element 38. The imaging element 38 outputs the image data generated by the photoelectric conversion element 42 to the signal processing circuit 34 under control of the controller 15.

The signal processing circuit 34 is a circuit that processes the image data. Specifically, the signal processing circuit 34 performs various types of signal processing on the image data input from the imaging element 38. The various types of signal processing performed by the signal processing circuit 34 include well-known signal processing such as white balance adjustment, sharpness adjustment, gamma correction, color space conversion processing, and color difference correction.

The various types of signal processing performed by the signal processing circuit 34 may be performed in a distributed manner by the signal processing circuit 34 and the imaging element 38. That is, at least a part of the various types of signal processing performed by the signal processing circuit 34 may be performed by a processing circuit 110 of the imaging element 38.

In the present embodiment, while the device including the ASIC and the FPGA is illustrated as the signal processing circuit 34, the technology of the present disclosure is not limited thereto. For example, the signal processing circuit 34 may be a device including an ASIC, an FPGA, or a PLD, a device including an FPGA and a PLD, or a device including an ASIC and a PLD.

In addition, the signal processing circuit 34 may be a computer including a CPU, a storage, and a memory. Here, the storage refers to a non-volatile storage device. A flash memory is exemplified as an example of the non-volatile storage device. However, the technology of the present disclosure is not limited thereto. An EEPROM, an HDD, and/or an SSD or the like may be used. In addition, the memory temporarily stores various types of information and is used as a work memory. A RAM is exemplified as an example of the memory. However, the technology of the present disclosure is not limited thereto. A storage device of other types may be used. The number of CPUs included in the computer may be singular or plural. In addition, a GPU may be used instead of the CPU. In addition, the signal processing circuit 34 may be implemented by a combination of a hardware configuration and a software configuration.

As illustrated in FIG. 4 as an example, the controller 15 comprises a CPU 50, a storage 51, a memory 52, an input I/F 57A, and an output I/F 57B. The CPU 50, the storage 51, the memory 52, the input I/F 57A, and the output I/F 57B are connected through a bus 100.

In the example illustrated in FIG. 4, while one bus is illustrated as the bus 100 for convenience of illustration, a plurality of buses may be used. The bus 100 may be a serial bus or may be a parallel bus including a data bus, an address bus, a control bus, and the like.

The storage 51 stores various parameters and various programs. The storage 51 is a non-volatile storage device. Here, a flash memory is employed as an example of the storage 51. The flash memory is merely an example. Instead of the flash memory or together with the flash memory, an EEPROM, an HDD, and/or an SSD or the like may be applied as the storage 51. In addition, the memory 52 temporarily stores various types of information and is used as a work memory. A RAM is exemplified as an example of the memory 52. However, the technology of the present disclosure is not limited thereto. A storage device of other types may be used.

The storage 51 stores various programs. The CPU 50 reads out a necessary program from the storage 51 and executes the read program on the memory 52. The CPU 50 controls the entire imaging apparatus 10 in accordance with the program executed on the memory 52.

The output I/F 57B is connected to the imaging element 38. The CPU 50 controls the imaging element 38 through the output I/F 57B. For example, the CPU 50 controls a timing of imaging performed by the imaging element 38 by supplying an imaging timing signal for defining the timing of imaging to the imaging element 38 through the output I/F 57B. The imaging element 38 performs the imaging at a first frame rate that is decided in accordance with the imaging timing signal input from the CPU 50. Here, 240 fps is exemplified as a specific example of the first frame rate. However, the technology of the present disclosure is not limited thereto. The first frame rate may be a frame rate (for example, 480 fps) exceeding 240 fps or a frame rate (for example, 120 fps) less than 240 fps.

The input I/F 57A is connected to the signal processing circuit 34. The image data on which the various types of signal processing are performed by the signal processing circuit 34 is output to the input I/F 57A by the signal processing circuit 34. The image data input into the input I/F 57A is stored in the memory 52.

An external I/F 104 is connected to the bus 100. The external I/F 104 is a communication device configured with a circuit. Here, while the device configured with the circuit is illustrated as the external I/F 104, the device is merely an example. The external I/F 104 may be a device including an ASIC, an FPGA, and/or a PLD. In addition, the external I/F 104 may be implemented by a combination of a hardware configuration and a software configuration.

A USB interface is exemplified as an example of the external I/F 104. An external apparatus (not illustrated) such as a smart device, a personal computer, a server, a USB memory, a memory card, and/or a printer can be directly or indirectly connected to the USB interface. The external I/F 104 controls exchange of various types of information between the imaging apparatus 10 and the external apparatus.

The UI system device 17 comprises the touch panel display 24 and a reception device 84. The display 26 and the touch panel 28 are connected to the bus 100. Accordingly, the CPU 50 displays various types of information on the display 26 and operates in accordance with various instructions received by the touch panel 28.

The reception device 84 comprises a hard key portion 25. The hard key portion 25 includes a plurality of hard keys and includes the release button 20 (refer to FIG. 1), the dial 23 (refer to FIG. 1 and FIG. 2), and the instruction key 27 (refer to FIG. 2). The hard key portion 25 is connected to the bus 100, and the CPU 50 acquires an instruction received by the hard key portion 25 and operates in accordance with the acquired instruction.

Figure 5:
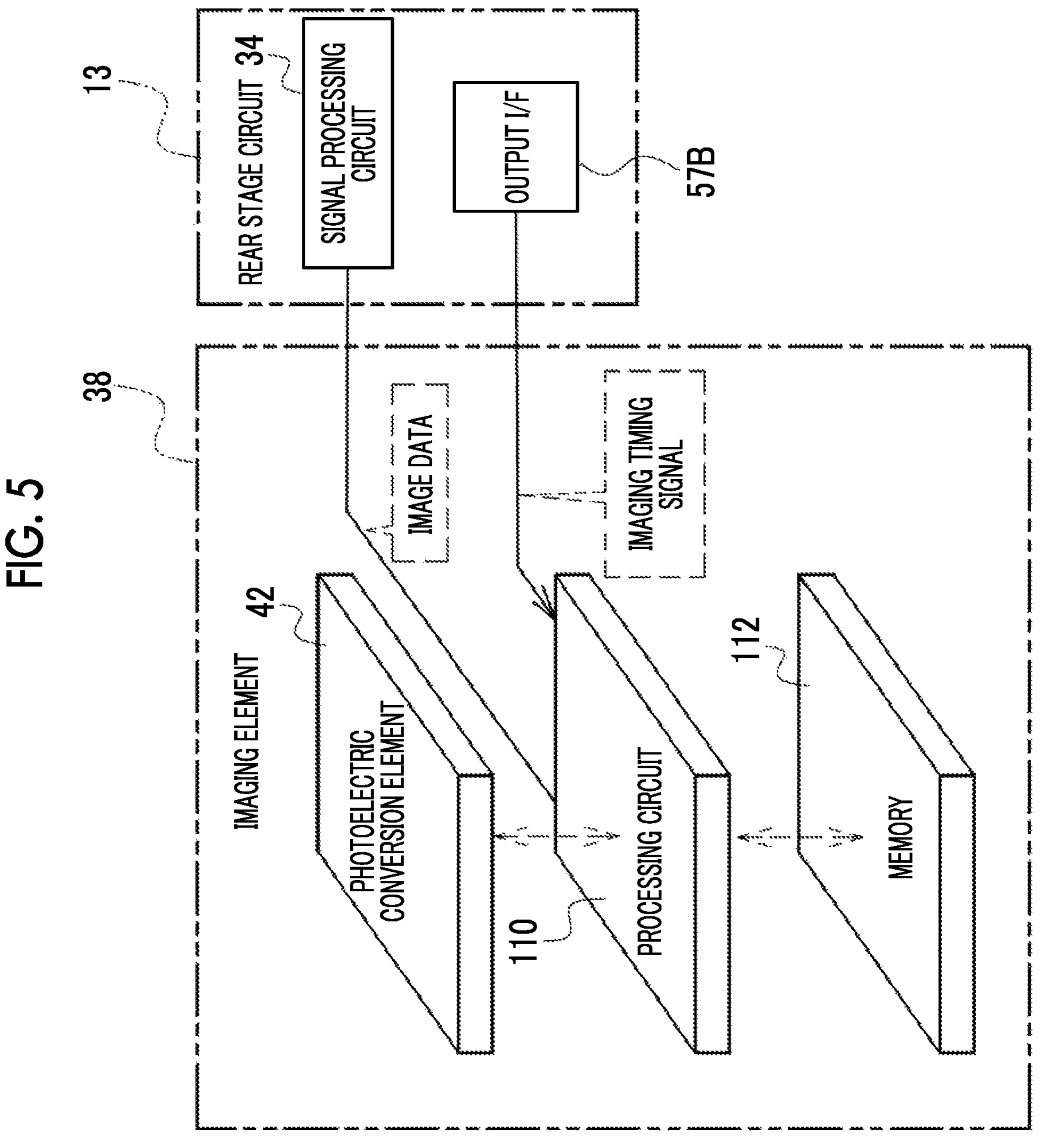
FIG. 5 is a conceptual diagram illustrating an example of a laminated structure of an imaging element included in the imaging apparatus according to the first to fourth embodiments.

As illustrated in FIG. 5 as an example, the imaging element 38 incorporates the photoelectric conversion element 42, the processing circuit 110, and a memory 112. The imaging element 38 is an example of an "imaging element" according to the embodiments of the technology of the present disclosure. The imaging element 38 is an imaging element in which the photoelectric conversion element 42, the processing circuit 110, and the memory 112 are formed in one chip. Accordingly, the photoelectric conversion element 42, the processing circuit 110, and the memory 112 are formed in one package. The imaging element 38 is configured by laminating the photoelectric conversion element 42 with the processing circuit 110 and the memory 112. Specifically, the photoelectric conversion element 42 and the processing circuit 110 are electrically connected to each other by a bump (not illustrated) of copper or the like having conductivity. The processing circuit 110 and the memory 112 are also electrically connected to each other by a bump (not illustrated) of copper or the like having conductivity.

The photoelectric conversion element 42 is an example of a "photoelectric conversion element" according to the embodiments of the technology of the present disclosure. The processing circuit 110 is an example of a "first processor" according to the embodiments of the technology of the present disclosure. The memory 112 is an example of a "memory" according to the embodiments of the technology of the present disclosure. The imaging element 38 is an example of a "laminated imaging element" according to the embodiments of the technology of the present disclosure.

For example, the processing circuit 110 is an LSI. The processing circuit 110 may be a device including an ASIC and an FPGA. In addition, the processing circuit 110 may be a device including an ASIC, an FPGA, or a PLD, a device including an FPGA and a PLD, or a device including an ASIC and a PLD. In addition, the processing circuit 110 may be implemented by a combination of a hardware configuration and a software configuration.

Here, a DRAM is employed as an example of the memory 112. The technology of the present disclosure is also established in a case where the memory 112 is a storage device of other types such as an SRAM.

The photoelectric conversion element 42 includes a plurality of photodiodes arranged in a matrix form. Photodiodes of "4896×3265" pixels are exemplified as an example of the plurality of photodiodes.

Color filters are arranged in each photodiode included in the photoelectric conversion element 42. The color filters include a G filter corresponding to green (G) that most contributes to obtaining a brightness signal, an R filter corresponding to red (R), and a B filter corresponding to blue (B).

The photoelectric conversion element 42 includes R pixels, G pixels, and B pixels. The R pixels are pixels corresponding to photodiodes in which the R filter is arranged. The G pixels are pixels corresponding to photodiodes in which the G filter is arranged. The B pixels are pixels corresponding to photodiodes in which the B filter is arranged. The R pixels, the G pixels, and the B pixels have predetermined periodicity in each of a row direction (horizontal direction) and a column direction (vertical direction). In the present embodiment, the R pixels, the G pixels, and the B pixels are arranged with periodicity corresponding to X-Trans (registered trademark) arrangement (refer to FIG. 7). While the X-Trans arrangement is illustrated here, the technology of the present disclosure is not limited thereto. Arrangement of the R pixels, the G pixels, and the B pixels may be Bayer arrangement or honeycomb arrangement.

The imaging element 38 has a so-called electronic shutter function. An electric charge accumulation time period of each photodiode in the photoelectric conversion element 42 is controlled by performing the electronic shutter function based on the imaging timing signal output from the CPU 50 through the output I/F 57B. The electric charge accumulation time period refers to a so-called shutter speed. The electric charges read out from each photodiode are output to the signal processing circuit 34 of the rear stage circuit 13 as the image data.

In the imaging element 38, imaging for the still picture image and imaging for the live view image are selectively performed. The imaging for the still picture image is implemented by performing the electronic shutter function and operating the mechanical shutter 41. The imaging for the live view image is implemented by performing the electronic shutter function without operating the mechanical shutter 41. While imaging using the mechanical shutter 41 is illustrated here, the mechanical shutter 41 is not essential for implementing imaging. Even in a case where the mechanical shutter 41 is not present, the imaging for the live view image and the imaging for the still picture image are implemented by performing the electronic shutter function. In addition, while the rolling shutter method is illustrated here, the technology of the present disclosure is not limited thereto. A global shutter method may be applied instead of the rolling shutter method.

As illustrated in FIG. 6 as an example, the processing circuit 110 comprises a control circuit 119, a reading circuit 115, a digital processing circuit 116, a first thinning-out circuit 118, a positional information acquisition circuit 120, an image cutout circuit 122, and an input-output I/F 113. The input-output I/F 113 includes an input I/F 113A and an output I/F 113B. The control circuit 119 is connected to the memory 112, the input-output I/F 113, the reading circuit 115, the digital processing circuit 116, the first thinning-out circuit 118, the positional information acquisition circuit 120, and the image cutout circuit 122.

The input I/F 113A is connected to the output I/F 57B of the rear stage circuit 13. The input I/F 113A receives the imaging timing signal output from the CPU 50 through the output I/F 57B. The input I/F 113A transfers the received imaging timing signal to the control circuit 119.

The reading circuit 115 controls the photoelectric conversion element 42 under control of the control circuit 119 and reads out analog image data 70 from the photoelectric conversion element 42 at the first frame rate.

Specifically, first, the input I/F 113A receives the imaging timing signal from the rear stage circuit 13 and transfers the received imaging timing signal to the control circuit 119. Next, the control circuit 119 transfers the transferred imaging timing signal to the reading circuit 115. The imaging timing signal includes a vertical synchronization signal and a horizontal synchronization signal. The reading circuit 115 starts reading out the analog image data 70 in units of frames from the photoelectric conversion element 42 in accordance with the vertical synchronization signal transferred from the control circuit 119. In addition, the reading circuit 115 starts reading out the analog image data 70 in units of horizontal lines in accordance with the horizontal synchronization signal transferred from the control circuit 119.

The reading circuit 115 performs analog signal processing on the analog image data 70 read out from the photoelectric conversion element 42. The analog signal processing includes well-known processing such as noise cancelation processing and analog gain processing. The noise cancelation processing is processing of canceling a noise caused by variations in characteristics between pixels included in the photoelectric conversion element 42. The analog gain processing is processing of applying a gain to the analog image data 70. The analog image data 70 on which the analog signal processing is performed in such a manner is output to the digital processing circuit 116 by the reading circuit 115.

The digital processing circuit 116 comprises an A/D converter 117. The A/D converter 117 performs A/D conversion on the analog image data 70. The digital processing circuit 116 further performs demosaicing on the image data subjected to the A/D conversion. For example, the demosaicing will be described below with reference to FIG. 7.

Figure 7:
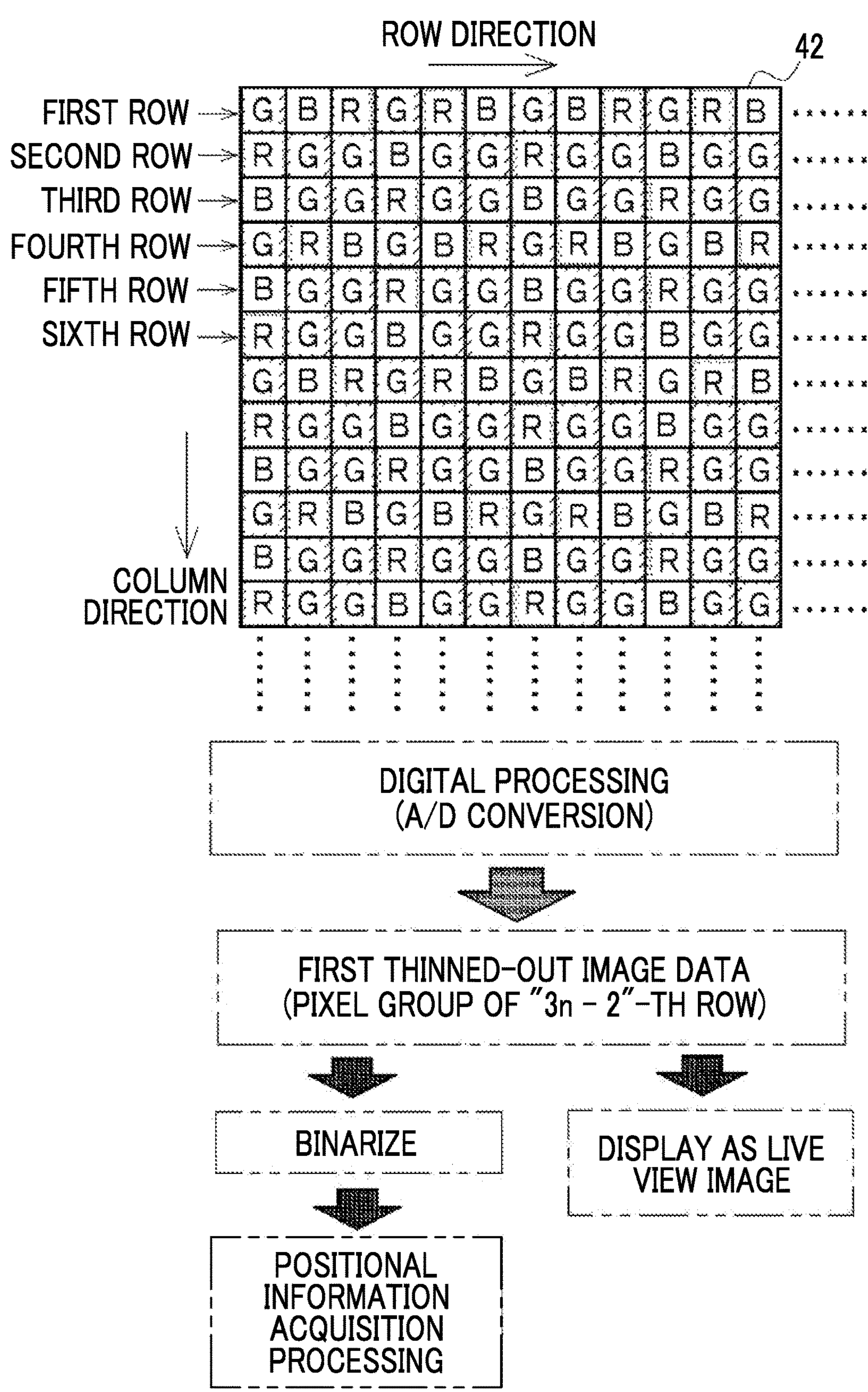
FIG. 7 is a conceptual diagram illustrating an example of pixel arrangement of a photoelectric conversion element and processing of digital image data in the imaging apparatus according to the first to fourth embodiments.

As illustrated in FIG. 7 as an example, in the photoelectric conversion element 42, the R pixels, the G pixels, and the B pixels are arranged in X-Trans (registered trademark) arrangement. An electric charge signal of a corresponding color is output from each pixel of the photoelectric conversion element 42 by performing the electronic shutter function. That is, data output from the photoelectric conversion element 42 is RAW data configured with R pixel data output from each R pixel, G pixel data output from each G pixel, and B pixel data output from each B pixel.

In the demosaicing, an insufficient color component among RGB components is complemented using pixel data of different colors arranged around each pixel. In the R pixels, an insufficient color component is complemented using the G pixel data of the G pixels and the B pixel data of the B pixels arranged around the R pixels. In the G pixels, an insufficient color component is complemented using the B pixel data of the B pixels and the R pixel data of the R pixels arranged around the G pixels. In the B pixels, an insufficient color component is complemented using the R pixel data of the R pixels and the G pixel data of the G pixels arranged around the B pixels. Furthermore, digital gain processing is performed on the image data after the demosaicing. Accordingly, digital image data 71 in which each pixel has pixel data of the RGB components is generated. The digital image data 71 obtained by performing imaging at the first frame rate in such a manner is stored in the memory 112.

The first thinning-out circuit 118 (refer to FIG. 6) performs first thinning-out processing. Here, thinning-out processing refers to processing of generating thinned-out image data by extracting only data of a specific column, row, or pixel from the image data. The thinning-out processing is performed based on a thinning-out rate obtained as a ratio of the number of pixels to be thinned out to the total number of pixels (the number of pixels to be thinned out/the total number of pixels).

The control circuit 119 can randomly access the memory 112, and reads out the digital image data 71 from the memory 112 and outputs the digital image data 71 to the first thinning-out circuit 118. The first thinning-out circuit 118 performs the first thinning-out processing of thinning out the digital image data 71 at a first thinning-out rate of, for example, two-thirds (hereinafter, referred to as ⅔) for the digital image data 71 input from the control circuit 119.

Figure 8:
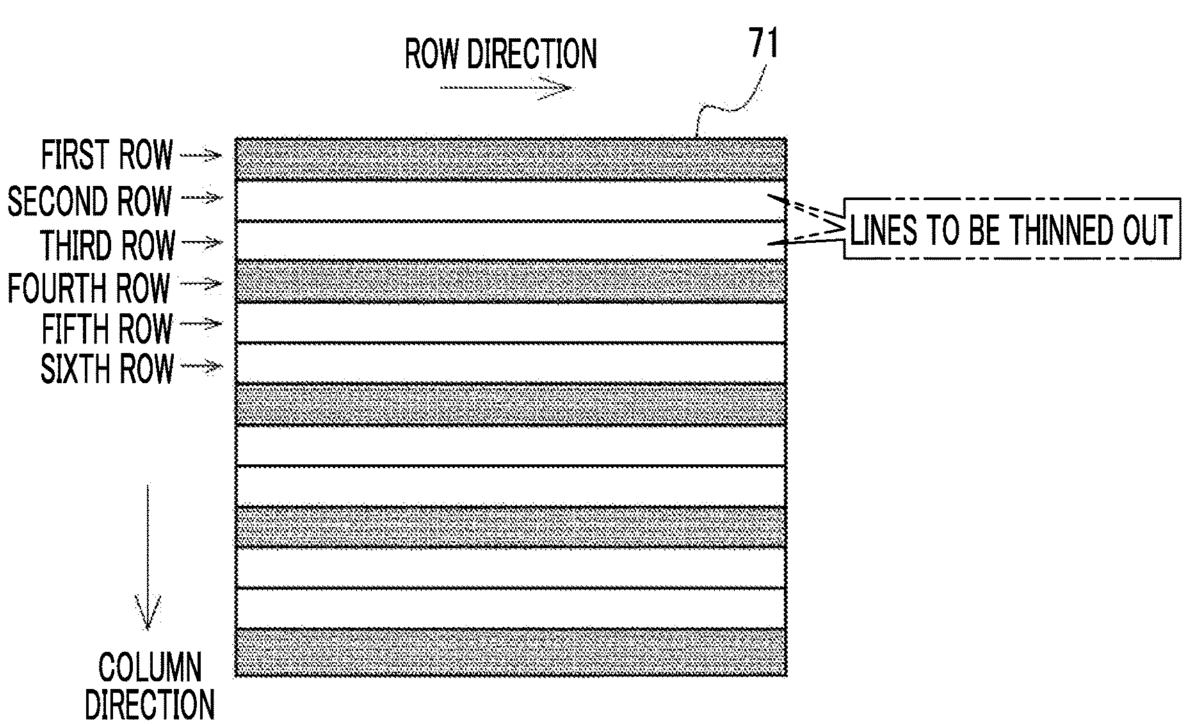
FIG. 8 is a conceptual diagram illustrating an example of a content of first thinning-out processing performed by a first thinning-out circuit included in the imaging element according to the first to fourth embodiments.

As illustrated in FIG. 8 as an example, since the first thinning-out rate is "⅔", for example, the first thinning-out circuit 118 generates first thinned-out image data 73 by thinning out the horizontal lines in the vertical direction by skipping two lines at a time. That is, the first thinned-out image data 73 is data obtained by extracting only pixel data of a "3n−2"-th row of the digital image data 71. Here, n is a positive integer. The first thinning-out circuit 118 stores the first thinned-out image data 73 in the memory 112 and outputs the first thinned-out image data 73 to the positional information acquisition circuit 120. In the present embodiment, while the first thinning-out rate is "⅔", the technology of the present disclosure is not limited thereto. In addition, the first thinning-out circuit 118 may thin out the vertical lines in the horizontal direction by skipping a plurality of lines at a time instead of thinning out the horizontal lines of the digital image data 71 in the vertical direction. Furthermore, the first thinning-out circuit 118 may thin out the digital image data 71 in units of pixels.

The positional information acquisition circuit 120 (refer to FIG. 6) detects an object in motion as the subject and detects a region including the subject as an image recognition region. The image recognition region is a region to be set as a processing target of the image recognition processing performed by the image recognition processing portion 66 of the rear stage circuit 13 using machine learning (for example, deep learning). The positional information acquisition circuit 120 further performs positional information acquisition processing of acquiring positional information of the detected image recognition region. The positional information acquisition circuit 120 performs the detection of the image recognition region and the positional information acquisition processing using the first thinned-out image data 73.

Figure 9:
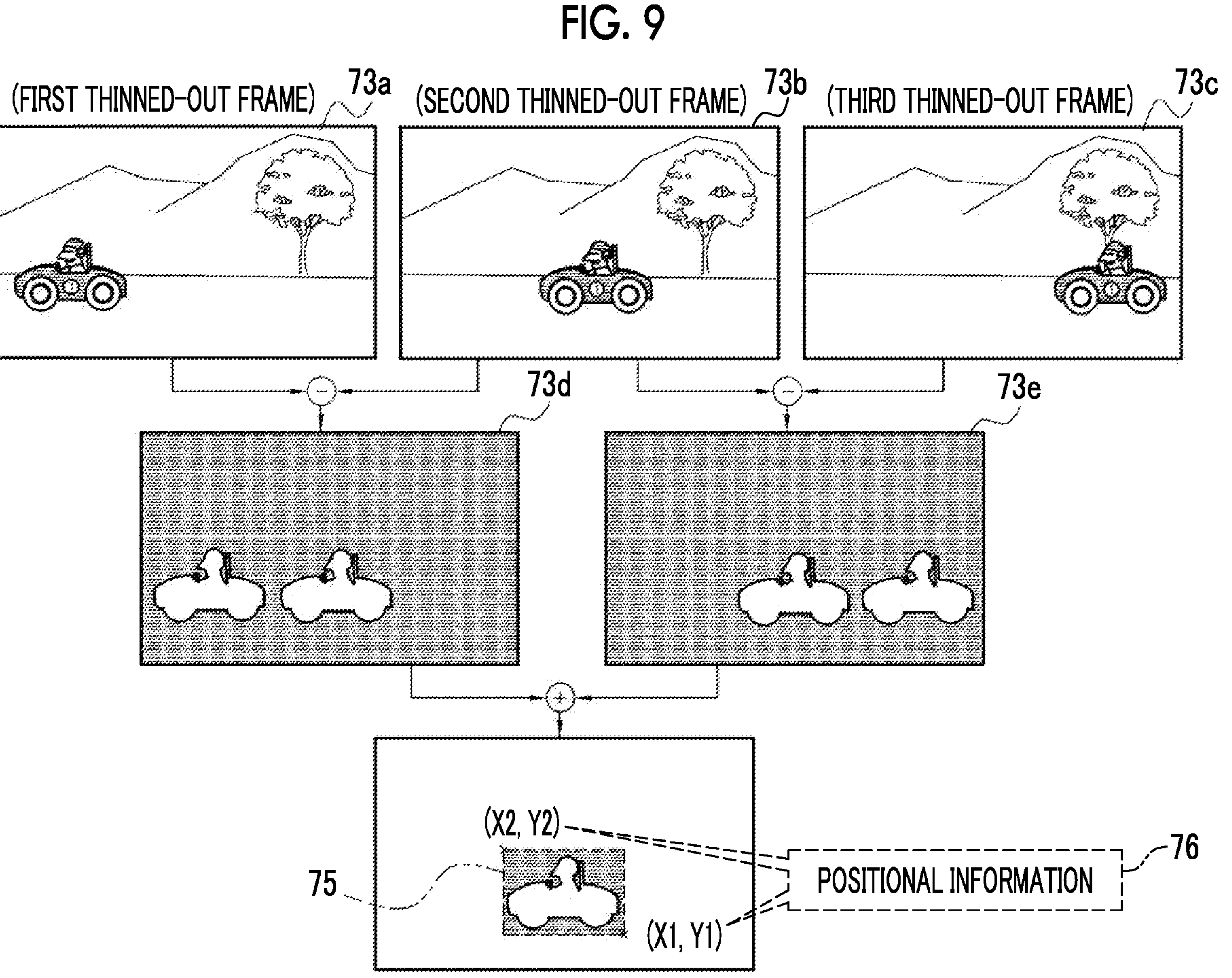
FIG. 9 is a conceptual diagram for describing an inter-frame difference method that is an example of a method for acquiring positional information of a subject.

As illustrated in FIG. 9 as an example, in the positional information acquisition processing, the first thinned-out image data 73 of three frames continuously acquired at the first frame rate is used. For example, it is assumed that a car that moves in a left direction from a right direction of FIG. 9 is captured in an image indicated by the first thinned-out image data 73 as a subject image showing the subject. For simplification of description, the newest first thinned-out image data 73 among the first thinned-out image data 73 of the three frames will be referred to as a first thinned-out frame 73*a*. The first thinned-out image data 73 that is immediately older than the newest first thinned-out image data 73 will be referred to as a second thinned-out frame 73*b*. The oldest first thinned-out image data 73 will be referred to as a third thinned-out frame 73*c*.

The positional information acquisition circuit 120 calculates a difference between the first thinned-out image data 73 of two continuously acquired frames and binarizes the difference. That is, the positional information acquisition circuit 120 acquires binarized difference data 73*d* by calculating a difference between frames of the first thinned-out frame 73*a* and the second thinned-out frame 73*b*. In addition, the positional information acquisition circuit 120 acquires binarized difference data 73*e* by calculating a difference between frames of the second thinned-out frame 73*b* and the third thinned-out frame 73*c*. In FIG. 9 as an example, while the subject image having the difference is white, and a background image not having the difference is black, the opposite may also apply. In addition, an absolute value of the difference may be calculated, and a predetermined value may be set as a boundary with respect to the absolute value of the difference. A part in which the absolute value of the difference is greater than the predetermined value may be white, and a part in which the absolute value of the difference is smaller than the predetermined value may be black.

Next, the positional information acquisition circuit 120 detects a common part by comparing two pieces of the binarized difference data obtained by different inter-frame operations. In the example in FIG. 9, a common part of one car at a center is obtained by comparing 73*d* and 73*e* that are the binarized difference data. The positional information acquisition circuit 120 detects the common part as an image recognition region 75 to be set as the processing target of the image recognition processing, described later, and acquires positional information 76 indicating a position of the image recognition region 75. In such a manner, the positional information 76 is information obtained from a detection result of the image recognition region 75 by the positional information acquisition circuit 120 with respect to the first thinned-out image data 73 obtained by thinning out the digital image data 71 at the first thinning-out rate.

As an example, the positional information acquisition circuit 120 sets a rectangular frame surrounding the image recognition region 75 and acquires lower right coordinates (X1, Y1) and upper left coordinates (X2, Y2) of the frame as the positional information 76. The positional information acquisition circuit 120 stores the acquired positional information 76 in the memory 112 and outputs the positional information 76 to the image cutout circuit 122. In the present embodiment, while the lower right and upper left coordinates of the rectangular frame are illustrated as an example of the positional information 76, the positional information 76 is not limited thereto. For example, the positional information 76 may be upper right and lower left coordinates. In addition, instead of using coordinates of two corners on a diagonal line of the rectangular frame, the positional information 76 may include coordinates of any one corner of the rectangular frame and lengths of the rectangular frame in the horizontal direction and the vertical direction. In addition, the positional information acquisition circuit 120 may acquire coordinate information in units of pixels of the detected image recognition region 75 without setting the rectangular frame surrounding the image recognition region 75.

The image cutout circuit 122 (refer to FIG. 6) performs image cutout processing of cutting out partial image data 72 from the digital image data 71 based on the digital image data 71 and the positional information 76. The control circuit 119 reads out the digital image data 71 from the memory 112 and outputs the digital image data 71 to the image cutout circuit 122. The image cutout processing refers to processing of extracting only image data having the coordinates indicated by the positional information 76 from the digital image data 71 and outputting the extracted image data as the partial image data 72. That is, the partial image data 72 is a part of the digital image data 71.

Figure 10:
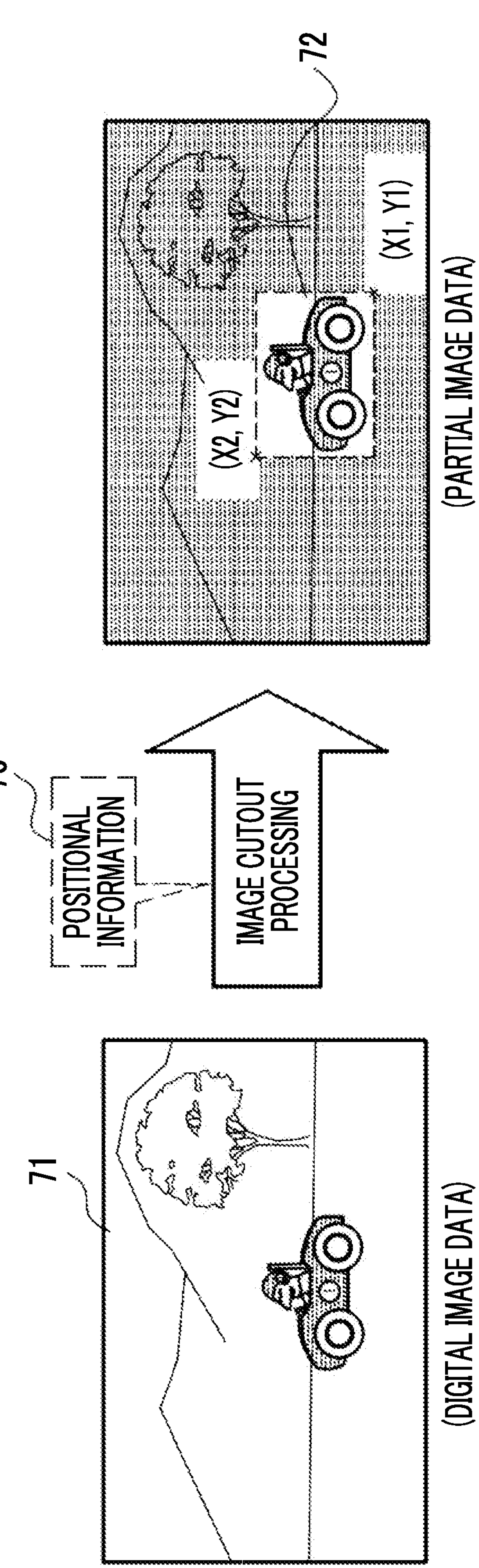
FIG. 10 is a conceptual diagram illustrating an example of a content of image cutout processing performed by an image cutout circuit included in the imaging element according to the first embodiment.

As illustrated in FIG. 10 as an example, the control circuit 119 reads out the digital image data 71 corresponding to the second thinned-out frame 73*b* from the memory 112 and outputs the digital image data 71 to the image cutout circuit 122. The image cutout circuit 122 generates the partial image data 72 having a rectangular shape by cutting out the digital image data 71 based on the coordinates (X1, Y1) and (X2, Y2) of the positional information 76 received from the positional information acquisition circuit 120.

The cut partial image data 72 includes only the image recognition region 75. The image cutout circuit 122 stores the generated partial image data 72 in the memory 112. In the present embodiment, while a case where the partial image data 72 has a rectangular shape is illustratively described, the cut partial image data 72 does not necessarily have a rectangular shape and may have any shape such as a circular shape or an elliptical shape. In addition, in a case where the coordinate information is acquired in units of pixels of the detected image recognition region 75, the image cutout circuit 122 may cut out the partial image data 72 in units of pixels.

The memory 112 stores the digital image data 71, the first thinned-out image data 73, the positional information 76, and the partial image data 72. The control circuit 119 reads out the first thinned-out image data 73, the positional information 76, and the partial image data 72 from the memory 112 and outputs the first thinned-out image data 73, the positional information 76, and the partial image data 72 to the rear stage circuit 13 at a second frame rate through the output I/F 113B and the input I/F 57A. The second frame rate is a frame rate that is independent of the first frame rate. Here, 60 fps is exemplified as a specific example of the second frame rate. However, the technology of the present disclosure is not limited thereto. A frame rate (for example, 120 fps) exceeding 60 fps may be used, or a frame rate (for example, 30 fps) less than 60 fps may be used. Here, while the second frame rate is lower than the first frame rate, the technology of the present disclosure is not limited thereto. The second frame rate may be higher than the first frame rate, or the first frame rate and the second frame rate may be equal.

In a case where the second frame rate is lower than the first frame rate, the control circuit 119 decreases the frame rate to the second frame rate by thinning out the first thinned-out image data 73, the positional information 76, and the partial image data 72 acquired at the first frame rate in units of frames. For example, in a case where the first frame rate is 240 fps, and the second frame rate is 60 fps, the control circuit 119 thins out three frames from the first thinned-out image data 73, the positional information 76, and the partial image data 72 of four frames and outputs the first thinned-out image data 73, the positional information 76, and the partial image data 72 of the remaining one frame.

Meanwhile, in a case where the second frame rate is higher than the first frame rate, for example, the control circuit 119 increases the frame rate to the second frame rate by continuously outputting the first thinned-out image data 73, the positional information 76, and the partial image data 72 of one frame acquired at the first frame rate a plurality of times.

As illustrated in FIG. 11 as an example, the partial image data 72, the first thinned-out image data 73, and the positional information 76 are input into the rear stage circuit 13 and are stored in the memory 52. The storage 51 of the rear stage circuit 13 stores a program 60 and a learned model 62. The CPU 50 functions as a second thinning-out processing portion 64 and the image recognition processing portion 66 by executing the program 60 on the memory 52 from the storage 51.

The second thinning-out processing portion 64 performs second thinning-out processing on the partial image data 72 generated based on the positional information 76. The second thinning-out processing refers to processing of generating second thinned-out image data 74 by thinning out the partial image data 72 at a second thinning-out rate. The second thinning-out rate is a thinning-out rate different from the first thinning-out rate. In the present embodiment, for example, the second thinning-out rate is a half (hereinafter, referred to as "½"). In the same manner as in the first thinning-out processing illustrated in FIG. 8, the second thinning-out processing portion 64 generates the second thinned-out image data 74 obtained by thinning out the horizontal lines in the vertical direction by skipping one line at a time and stores the second thinned-out image data 74 in the memory 52. In addition, in the present embodiment, while the second thinning-out rate is "½", the technology of the present disclosure is not limited thereto. In addition, the second thinning-out processing portion 64 may thin out the vertical lines in the horizontal direction instead of thinning out the horizontal lines of the partial image data 72 in the vertical direction. Furthermore, the second thinning-out processing portion 64 may thin out the partial image data 72 in units of pixels.

The image recognition processing portion 66 performs the image recognition processing on the image recognition region based on the positional information 76. In the present embodiment, the image recognition region is a region including a moving object image detected by the positional information acquisition circuit 120. Here, the moving object image refers to the image showing the subject in motion.

The image recognition processing portion 66 acquires image recognition information 78 by performing the image recognition processing using machine learning on the second thinned-out image data 74 obtained by thinning out the partial image data 72 including the image recognition region at the second thinning-out rate. Specifically, for example, the image recognition processing portion 66 performs category recognition of the moving object image included in a second thinned-out image indicated by the second thinned-out image data 74 in two steps by executing the image recognition processing. In the technology of the present disclosure, the moving object image, for example, an image showing a vehicle such as a car, a motorcycle, an airplane, a bicycle, or a ship or an image showing an animate object such as a person, an animal, a bird, or an insect is exemplified as a category of a first step.

A category of a second step is a subcategory for further categorizing the moving object image categorized into a specific category in the category recognition of the first step. For example, the subcategory for further recognizing the moving object image recognized as belonging to "car" in the first step includes a car type, a color, a manufacturing maker, or a model. For example, the subcategory for further recognizing the moving object image recognized as belonging to "person" in the first step includes a sex, a race, a body shape, or an age.

The learned model 62 stored in the storage 51 stores a model obtained by learning in the past and enables high-accuracy recognition in multiple categories. Furthermore, each time the image recognition processing portion 66 performs the image recognition processing, learning is newly performed using the image recognition region 75, and the learned model 62 is updated.

In the present embodiment, while the image recognition processing portion 66 performs the category recognition in two steps, the category recognition of the first step may be performed by the processing circuit 110 of the imaging element 38, and the category recognition of the second step may be performed by the image recognition processing portion 66. The image recognition information 78 obtained by the image recognition processing is stored in the memory 52.

The second thinning-out rate used in the second thinning-out processing is lower than the first thinning-out rate used in the first thinning-out processing. Thus, in the positional information acquisition processing performed by the positional information acquisition circuit 120, the image recognition region 75 and the positional information 76 are acquired in a short time period using the first thinned-out image data 73 thinned out at the first thinning-out rate that is a higher thinning-out rate. Meanwhile, in the image recognition processing performed by the image recognition processing portion 66 of the rear stage circuit 13, the image recognition information 78 having high accuracy is obtained using the second thinned-out image data 74 thinned out at the second thinning-out rate that is a lower thinning-out rate.

Figure 12:
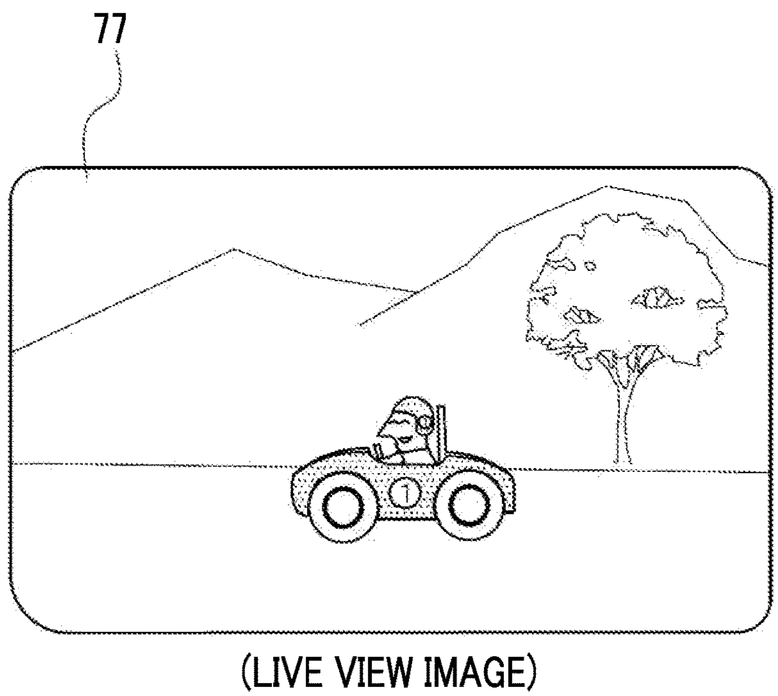
FIG. 12 is a conceptual diagram illustrating an example of a live view image displayed on a display in the first to fourth embodiments.

The imaging apparatus 10 has a live view image display mode in which the live view image is displayed on the display 26, and an image recognition mode in which an image recognition result of the subject shown in the live view image is displayed. In a case where the imaging apparatus 10 is in the live view image display mode, the CPU 50 reads out the first thinned-out image data 73 from the memory 52. As illustrated in FIG. 12 as an example, the CPU 50 displays the image indicated by the first thinned-out image data 73 on the display 26 as a live view image 77. The live view image 77 is an example of a "display motion picture image" according to the embodiments of the technology of the present disclosure.

Figure 13:
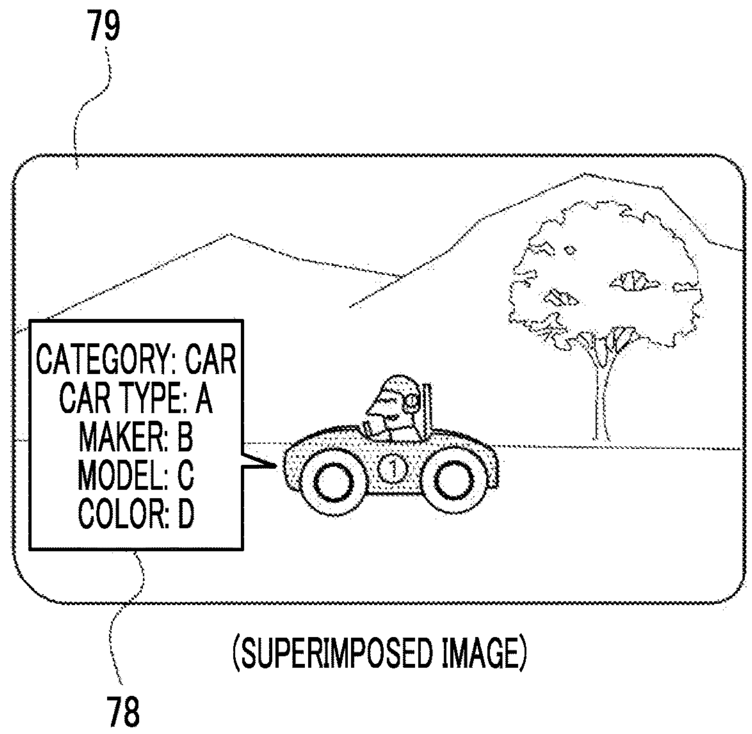
FIG. 13 is a conceptual diagram illustrating an example of a superimposed image displayed on the display in the first to fourth embodiments.

In a case where the imaging apparatus 10 is in the image recognition mode, the CPU 50 reads out the first thinned-out image data 73, the positional information 76, and the image recognition information 78 from the memory 52 and outputs the first thinned-out image data 73, the positional information 76, and the image recognition information 78 to the display 26. Accordingly, as illustrated in FIG. 13 as an example, a superimposed image 79 obtained by superimposing the image recognition information 78 on the live view image 77 (refer to FIG. 12) indicated by the first thinned-out image data 73 is displayed on the display 26. In the superimposed image 79, a position at which the image recognition information 78 is displayed is decided based on the coordinates indicated by the positional information 76.

In FIG. 13, for example, the image recognition processing has been performed on the image recognition region 75 illustrated in FIG. 9. As an image recognition processing result, the image recognition information 78 is displayed in a superimposed manner on the live view image 77 in a form of a speech balloon. The image recognition processing result first includes "car" that is a category recognition result of the first step, and further includes a car type, a manufacturing maker, a model, and a color that are a category recognition result of the second step. In the example in FIG. 13, while one type of image recognition information 78 is displayed, the number of pieces of image recognition information 78 displayed in the superimposed image 79 of one frame may be plural.

Figure 14:
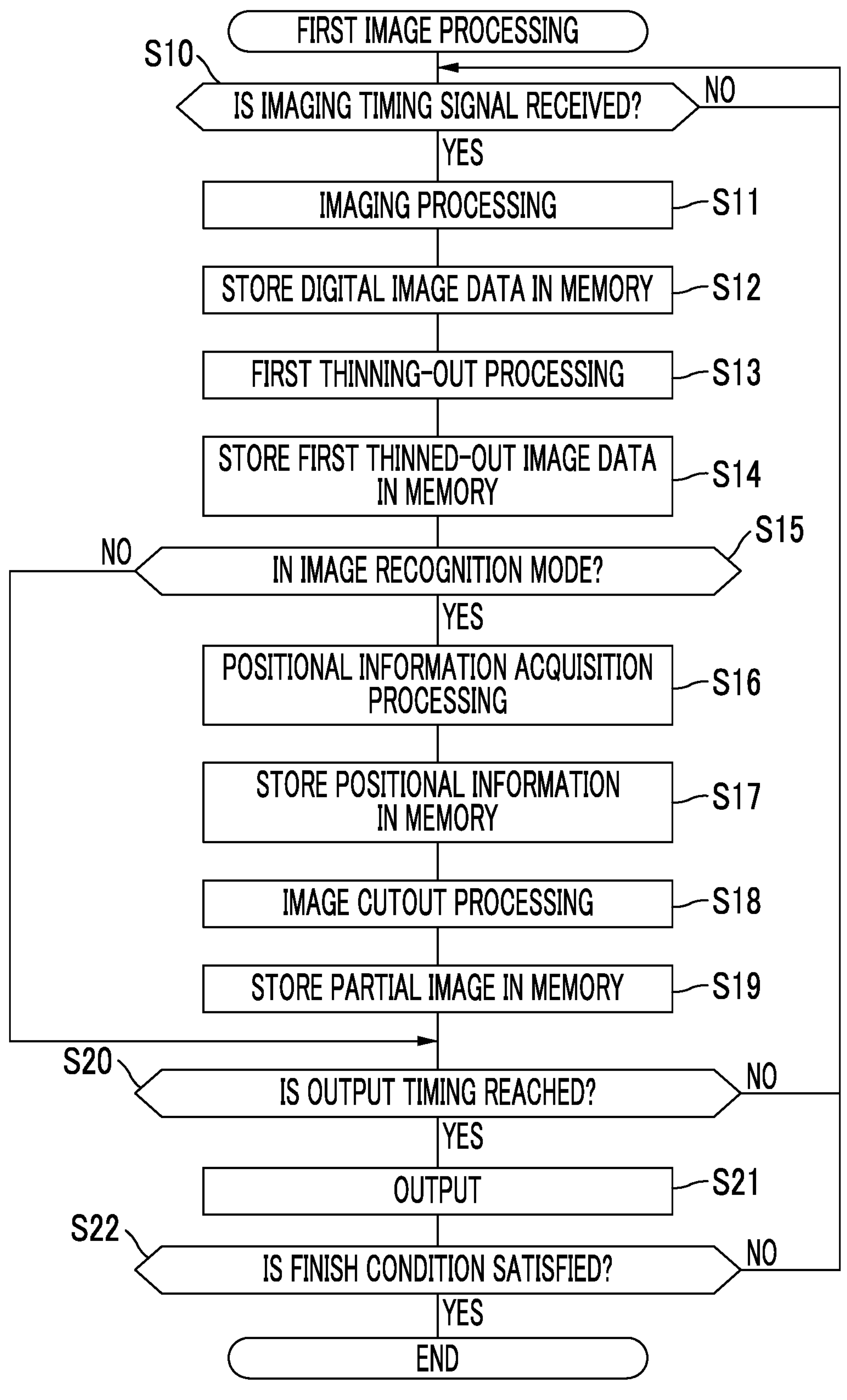
FIG. 14 is a flowchart illustrating an example of a flow of first image processing according to the first embodiment.

Next, an action of the imaging apparatus 10 according to the first embodiment will be described with reference to FIG. 14 and FIG. 15. FIG. 14 illustrates an example of a flow of first image processing executed by the imaging element 38. FIG. 15 illustrates an example of a flow of second image processing executed by the rear stage circuit 13. For convenience of description, the analog image data 70, the digital image data 71, the partial image data 72, the first thinned-out image data 73, and the second thinned-out image data 74 will be simply referred to as "image data" unless otherwise necessary to distinguish therebetween.

In the first image processing illustrated in FIG. 14, first, in step S10, the control circuit 119 determines whether or not the imaging timing signal is received by the input I/F 113A. In step S10, in a case where the imaging timing signal is not received by the input I/F 113A, a negative determination is made, and step S10 of the first image processing is executed again. In step S10, in a case where the imaging timing signal is received by the input I/F 113A, a positive determination is made, and the first image processing transitions to step S11.

In step S11, imaging processing is performed. The control circuit 119 controls the reading circuit 115 and the digital processing circuit 116 based on the imaging timing signal. Accordingly, the imaging element 38 generates the digital image data 71 by imaging the subject at the first frame rate based on the imaging timing signal. Then, the first image processing transitions to step S12.

In step S12, the digital processing circuit 116 stores the generated digital image data 71 in the memory 112. Then, the first image processing transitions to step S13.

In step S13, the control circuit 119 reads out the digital image data 71 from the memory 112 and outputs the digital image data 71 to the first thinning-out circuit 118. The first thinning-out circuit 118 generates the first thinned-out image data 73 by executing the first thinning-out processing based on the first thinning-out rate. Then, the first image processing transitions to step S14.

In step S14, the first thinning-out circuit 118 stores the first thinned-out image data 73 in the memory 112. Furthermore, the first thinning-out circuit 118 outputs the first thinned-out image data 73 to the positional information acquisition circuit 120. Then, the first image processing transitions to step S15.

In step S15, the control circuit 119 determines whether or not the imaging apparatus 10 is in the image recognition mode. In step S15, in a case where the imaging apparatus 10 is not in the image recognition mode, that is, in a case where the imaging apparatus 10 is in the live view image display mode, a negative determination is made, and the first image processing transitions to step S20. In step S15, in a case where the imaging apparatus 10 is in the image recognition mode, a positive determination is made, and the first image processing transitions to step S16.

In step S16, the positional information acquisition circuit 120 performs the positional information acquisition processing. The positional information acquisition processing is processing of acquiring positional information of the image recognition region 75 to be set as the processing target of the image recognition processing performed by the rear stage circuit 13 in the digital image data 71. In the positional information acquisition processing, the positional information 76 of the image recognition region 75 is acquired based on the first thinned-out image data 73. Then, the first image processing transitions to step S17.

In step S17, the positional information acquisition circuit 120 stores the acquired positional information 76 in the memory 112. Furthermore, the positional information acquisition circuit 120 outputs the positional information 76 to the image cutout circuit 122. Then, the first image processing transitions to step S18.

In step S18, the control circuit 119 reads out the digital image data 71 from the memory 112 and outputs the digital image data 71 to the image cutout circuit 122. The image cutout circuit 122 executes the image cutout processing of cutting out the partial image data 72 from the digital image data 71 based on the positional information 76 input from the positional information acquisition circuit 120. Then, the first image processing transitions to step S19.

In step S19, the image cutout circuit 122 stores the partial image data 72 in the memory 112. Then, the first image processing transitions to step S20.

In step S20, the control circuit 119 determines whether or not an output timing at which data stored in the memory 112 is output is reached. The output timing is set to the second frame rate that is independent of the first frame rate. In a case where the output timing is not reached, a negative determination is made, and the first image processing transitions to step S10. In step S20, in a case where the output timing is reached, a positive determination is made, and the first image processing transitions to step S21.

In step S21, the control circuit 119 reads out the data stored in the memory 112 and outputs the read data to the rear stage circuit 13 through the output I/F 113B and the input I/F 57A. In a case where the imaging apparatus 10 is in the live view image display mode, the control circuit 119 reads out the first thinned-out image data 73 from the memory 112 and outputs the first thinned-out image data 73 to the rear stage circuit 13. Accordingly, the live view image is displayed on the display 26. In a case where the imaging apparatus 10 is in the image recognition mode, the control circuit 119 reads out the first thinned-out image data 73, the positional information 76, and the partial image data 72 from the memory 112 and outputs the first thinned-out image data 73, the positional information 76, and the partial image data 72 to the rear stage circuit 13. Accordingly, the superimposed image obtained by superimposing the image recognition information 78 on the live view image is displayed on the display 26. Then, the first image processing transitions to step S22.

In step S22, the control circuit 119 determines whether or not a condition (hereinafter, referred to as a "first image processing finish condition") under which the first image processing is finished is satisfied. A condition that an instruction to finish the imaging mode is received by the reception device 84 (refer to FIG. 4) is exemplified as an example of the first image processing finish condition. In step S22, in a case where the first image processing finish condition is not satisfied, a negative determination is made, and the first image processing transitions to step S10. In step S22, in a case where the first image processing finish condition is satisfied, a positive determination is made, and the first image processing is finished.

Next, in the second image processing illustrated in FIG. 15, first, in step S30, the CPU 50 determines whether or not the first thinned-out image data 73 is received by the input I/F 57A. In step S30, in a case where the first thinned-out image data 73 is not received, a negative determination is made, and step S30 of the second image processing is executed again. In step S30, in a case where the first thinned-out image data 73 is received, a positive determination is made, and the second image processing transitions to step S31.

In step S31, the CPU 50 stores the first thinned-out image data 73 in the memory 52. Then, the second image processing transitions to step S32.

In step S32, the CPU 50 determines whether or not the positional information 76 and the partial image data 72 are received by the input I/F 57A. In step S32, in a case where the positional information 76 and the partial image data 72 are not received, a negative determination is made, and the second image processing transitions to step S37.

In step S37, the CPU 50 reads out the first thinned-out image data 73 from the memory 52 and displays the image indicated by the first thinned-out image data 73 on the display 26 as the live view image 77. Then, the second image processing transitions to step S38.

Meanwhile, in step S32, in a case where the positional information 76 and the partial image data 72 are received, a positive determination is made, and the second image processing transitions to step S33.

In step S33, the CPU 50 stores the positional information 76 and the partial image data 72 in the memory 52. Then, the second image processing transitions to step S34.

In step S34, the CPU 50 functions as the second thinning-out processing portion 64 by reading out the program 60 from the storage 51 and executing the program 60 on the memory 52. The second thinning-out processing portion 64 performs the second thinning-out processing on the partial image data 72. The second thinning-out processing is processing of generating the second thinned-out image data 74 by thinning out the partial image data 72 based on the second thinning-out rate. The second thinning-out processing portion 64 stores the generated second thinned-out image data 74 in the memory 52. Then, the second image processing transitions to step S35.

In step S35, the CPU 50 functions as the image recognition processing portion 66 by reading out the program 60 from the storage 51 and executing the program 60 on the memory 52. The image recognition processing portion 66 performs the category recognition of the subject captured in the second thinned-out image by performing the image recognition processing using machine learning on the second thinned-out image data 74. The image recognition processing portion 66 stores the image recognition result of the image recognition processing in the memory 52 as the image recognition information 78. Then, the second image processing transitions to step S36.

In step S36, the CPU 50 reads out the first thinned-out image data 73, the positional information 76, and the image recognition information 78 from the memory 52. The CPU 50 displays the superimposed image 79 obtained by superimposing the image recognition information 78 on the live view image 77 indicated by the first thinned-out image data 73, on the display 26. Then, the second image processing transitions to step S38.

In step S38, the CPU 50 determines whether or not a condition (hereinafter, referred to as a "second image processing finish condition") under which the second image processing is finished is satisfied. A condition that an instruction to finish the imaging mode is received by the reception device 84 (refer to FIG. 4) is exemplified as an example of the second image processing finish condition. In step S38, in a case where the second image processing finish condition is not satisfied, a negative determination is made, and the second image processing transitions to step S30. In step S38, in a case where the second image processing finish condition is satisfied, a positive determination is made, and the second image processing is finished.

In the first embodiment, the first thinning-out circuit 118 generates the first thinned-out image data 73 by thinning out the digital image data 71 at the first thinning-out rate, and the positional information acquisition circuit 120 acquires the positional information 76 based on the first thinned-out image data 73. In addition, the first thinned-out image data 73 is output to the rear stage circuit 13, and the CPU 50 displays the image indicated by the first thinned-out image data 73 on the display 26 as the live view image 77. However, the technology of the present disclosure is not limited thereto. The positional information acquisition circuit 120 may acquire the positional information 76 based on the digital image data 71 instead of the first thinned-out image data 73. In addition, the CPU 50 may display an image indicated by the digital image data 71 or an image indicated by a thinned-out image obtained by thinning out the digital image data 71 by the rear stage circuit 13 on the display 26 as the live view image 77. In this case, the processing circuit 110 may not comprise the first thinning-out circuit 118. Thus, a size of the LSI constituting the processing circuit 110 is decreased, and a circuit design is simplified.

In the first embodiment, the second thinning-out processing portion 64 generates the second thinned-out image data 74 by thinning out the partial image data 72 at the second thinning-out rate, and the image recognition processing portion 66 performs the image recognition processing on the second thinned-out image data 74. However, the technology of the present disclosure is not limited thereto. The image recognition processing portion 66 may perform the image recognition processing on the partial image data 72. In addition, the processing circuit 110 may output the digital image data 71 and the positional information 76 to the rear stage circuit 13, and the image recognition processing portion 66 may perform the image recognition processing on the digital image data 71 based on the positional information 76. In this case, since the image recognition processing portion 66 performs the image recognition processing on the partial image data 72 or the digital image data 71 that is not subjected to the thinning-out processing, the image recognition information 78 having higher accuracy can be obtained.

As described above, the imaging apparatus 10 according to the first embodiment comprises the imaging element 38 and the rear stage circuit 13. The imaging element 38 incorporates the memory 52 that stores the digital image data 71 obtained by performing imaging at the first frame rate, the partial image data 72, and/or the first thinned-out image data 73, and the processing circuit 110 that outputs the partial image data 72 and/or the first thinned-out image data 73 at the second frame rate which is independent of the first frame rate. The partial image data 72 and/or the first thinned-out image data 73 is input into the rear stage circuit 13 from the processing circuit 110. The processing circuit 110 acquires the positional information 76 indicating the position of the image recognition region 75 to be set as the processing target of the image recognition processing in the digital image data 71 or the first thinned-out image data 73. The rear stage circuit 13 performs the image recognition processing on the image recognition region 75 based on the positional information 76. Accordingly, a processing load of the imaging element 38 is reduced, compared to a case where the image recognition processing is performed on the image recognition region 75 in the imaging element 38. The partial image data 72 and/or the first thinned-out image data 73 is not essentially directly input into the rear stage circuit 13 from the processing circuit 110 and, for example, may pass through a signal level conversion circuit or a processing circuit in the middle or a signal processing circuit or a signal processing processor that performs a different type of signal processing.

The positional information 76 is the coordinates indicating the position of the image recognition region 75 in the digital image data 71 or the first thinned-out image data 73. Accordingly, the position of the image recognition region 75 in the digital image data 71 or the first thinned-out image data 73 can be easily specified, compared to a case where information indicating the position of the image recognition region 75 in the digital image data 71 or the first thinned-out image data 73 is not used.

The processing circuit 110 detects the image recognition region 75 from the first thinned-out image data 73 based on the difference between the frames of the first thinned-out image data 73 and acquires the positional information 76 based on the detection result. Accordingly, the moving object image can be easily detected as the image recognition region 75, compared to a case where the image recognition region 75 is detected without using the difference between the frames of the first thinned-out image data 73.

The partial image data 72 includes only the image recognition region 75. Accordingly, a data amount output from the processing circuit 110 can be decreased, compared to a case where the entire digital image data 71 is output.

The processing circuit 110 outputs the first thinned-out image data 73 obtained by thinning out the digital image data 71 at the first thinning-out rate, the partial image data 72, and the positional information 76 at the second frame rate. Accordingly, the data amount output from the processing circuit 110 can be decreased, compared to a case where the digital image data 71 is output without thinning out the digital image data 71.

The positional information 76 is information obtained from the detection result of the image recognition region 75 by the processing circuit 110 with respect to the first thinned-out image data 73 obtained by thinning out the digital image data 71 at the first thinning-out rate. Accordingly, a load exerted on the processing of obtaining the positional information 76 is reduced, compared to a case where the positional information 76 is obtained from a non-thinned-out image.

The rear stage circuit 13 displays the image indicated by the first thinned-out image data 73 on the display 26 as the live view image 77. Accordingly, the live view image 77 can be displayed on the display 26 with a low load, compared to a case where the non-thinned-out image is displayed on the display 26 as the live view image 77.

The rear stage circuit 13 performs the image recognition processing on the second thinned-out image data 74 obtained by thinning out the partial image data 72 or the digital image data 71 at the second thinning-out rate. Accordingly, a load exerted on the image recognition processing is reduced, compared to a case where the image recognition processing is performed on the non-thinned-out image.

The first thinning-out rate and the second thinning-out rate are different. Accordingly, both of easy acquisition of the positional information 76 and high accuracy of the image recognition processing can be established, compared to a case where the first thinning-out rate and the second thinning-out rate are the same.

The second thinning-out rate is lower than the first thinning-out rate. Accordingly, the image recognition processing can be performed with high accuracy, compared to a case where the image recognition processing is performed on an image thinned out at the first thinning-out rate.

The imaging element 38 is an imaging element in which at least the photoelectric conversion element 42 and the memory 112 are formed in one chip. Accordingly, it is possible to contribute to size reduction of the imaging apparatus, compared to a case where the photoelectric conversion element 42 and the memory 112 are not formed in one chip.

The imaging element 38 is a laminated imaging element in which the photoelectric conversion element 42 and the memory 112 are laminated. Accordingly, a transfer speed of the digital image data 71 from the photoelectric conversion element 42 to the memory 112 can be increased, compared to a case of not laminating the photoelectric conversion element 42 and the memory 112.

Second Embodiment

In the first embodiment, while the image cutout circuit 122 creates the partial image data 72 by cutting out the digital image data 71 based on the positional information 76, the technology of the present disclosure is not limited thereto.

As illustrated in FIG. 16 as an example, in the imaging apparatus 10 according to a second embodiment, the processing circuit 110 of the imaging element 38 comprises a divided image selection circuit 124 instead of the image cutout circuit 122 in the first embodiment. Divided image selection processing performed by the divided image selection circuit 124 will be described below. Other configurations and processing of the imaging apparatus 10 are the same as the imaging apparatus 10 according to the first embodiment and thus, are designated by the same reference numerals and not described in detail.

The divided image selection circuit 124 performs the divided image selection processing. The divided image selection processing is processing of preparing a plurality of divided images obtained by dividing the image indicated by the first thinned-out image data 73 into a plurality of parts in advance, and generating the partial image data 72 by selecting a divided image including the image recognition region 75.

Figure 17:
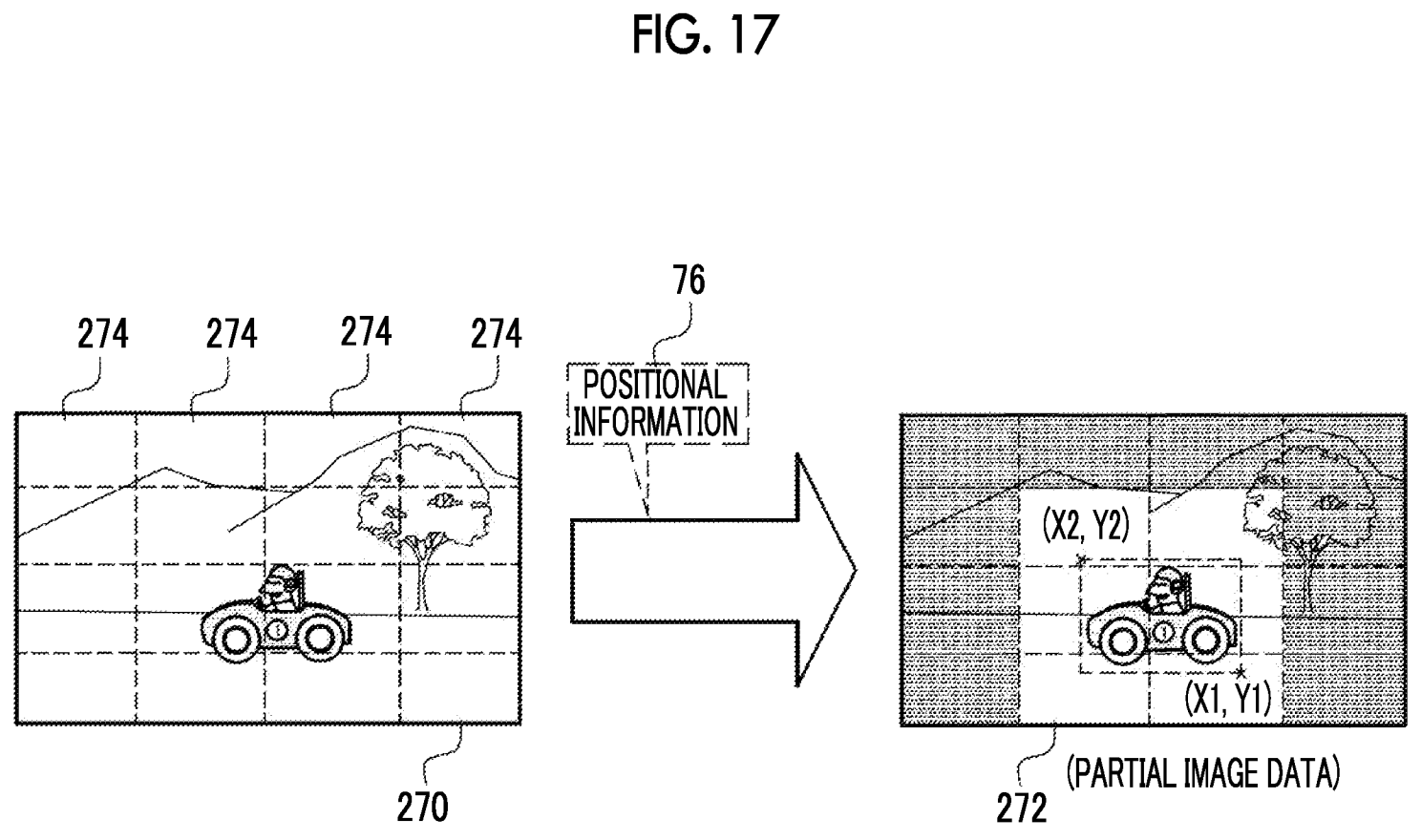

As illustrated in FIG. 17 as an example, an image 270 indicated by the first thinned-out image data 73 is divided into 16 divided images 274 consisting of vertically four columns×horizontally four rows in advance. The divided image selection circuit 124 selects the divided image 274 including the image recognition region 75 based on the positional information 76. In the example in FIG. 17, the divided image selection circuit 124 selects six divided images 274 present in a lower center portion from the 16 divided images 274 as a partial image 272. The divided image selection circuit 124 generates the partial image data 72 by extracting a part indicating the partial image 272 from the digital image data 71.

As described above, the imaging apparatus 10 according to the second embodiment comprises the divided image selection circuit 124. The divided image selection circuit 124 generates the partial image data 72 including the image recognition region 75 based on the positional information 76. According to the second embodiment, since the image cutout circuit 122 is not necessary, the partial image data 72 can be generated by simple processing compared to the image cutout processing.

In the second embodiment, while the image 270 is divided in advance into the 16 divided images 274, the number of divisions of the image 270 may be greater or less than 16 as long as the number is greater than or equal to 2.

Third Embodiment

In a third embodiment, the processing circuit comprises a combining circuit that creates combined image data of one frame having high image quality by combining digital image data of a plurality of frames obtained at the first frame rate.

Figure 18:
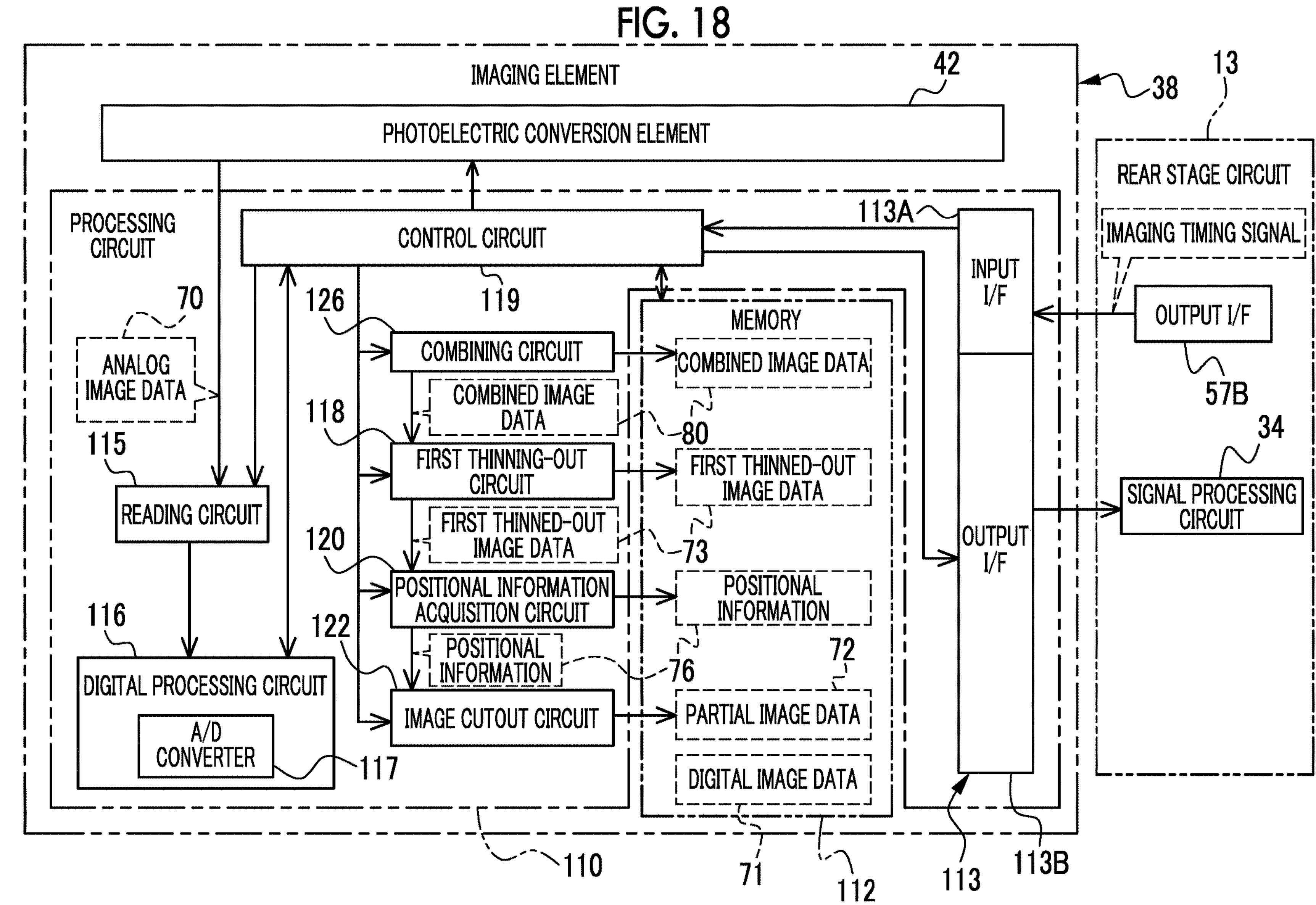
FIG. 18 is a block diagram illustrating an example of a hardware configuration of an electric system of the imaging element included in the imaging apparatus according to the third embodiment.

As illustrated in FIG. 18 as an example, in the imaging apparatus 10 according to the third embodiment, the processing circuit 110 comprises a combining circuit 126. The combining circuit 126 performs combining processing of creating combined image data 80 of one frame by combining the digital image data 71 of a plurality of frames. The combined image data 80 is an example of "combined image data" according to the embodiments of the technology of the present disclosure. Other configurations and processing of the imaging apparatus 10 are the same as the imaging apparatus 10 according to the first embodiment and thus, are designated by the same reference numerals and not described in detail.

Figure 19:
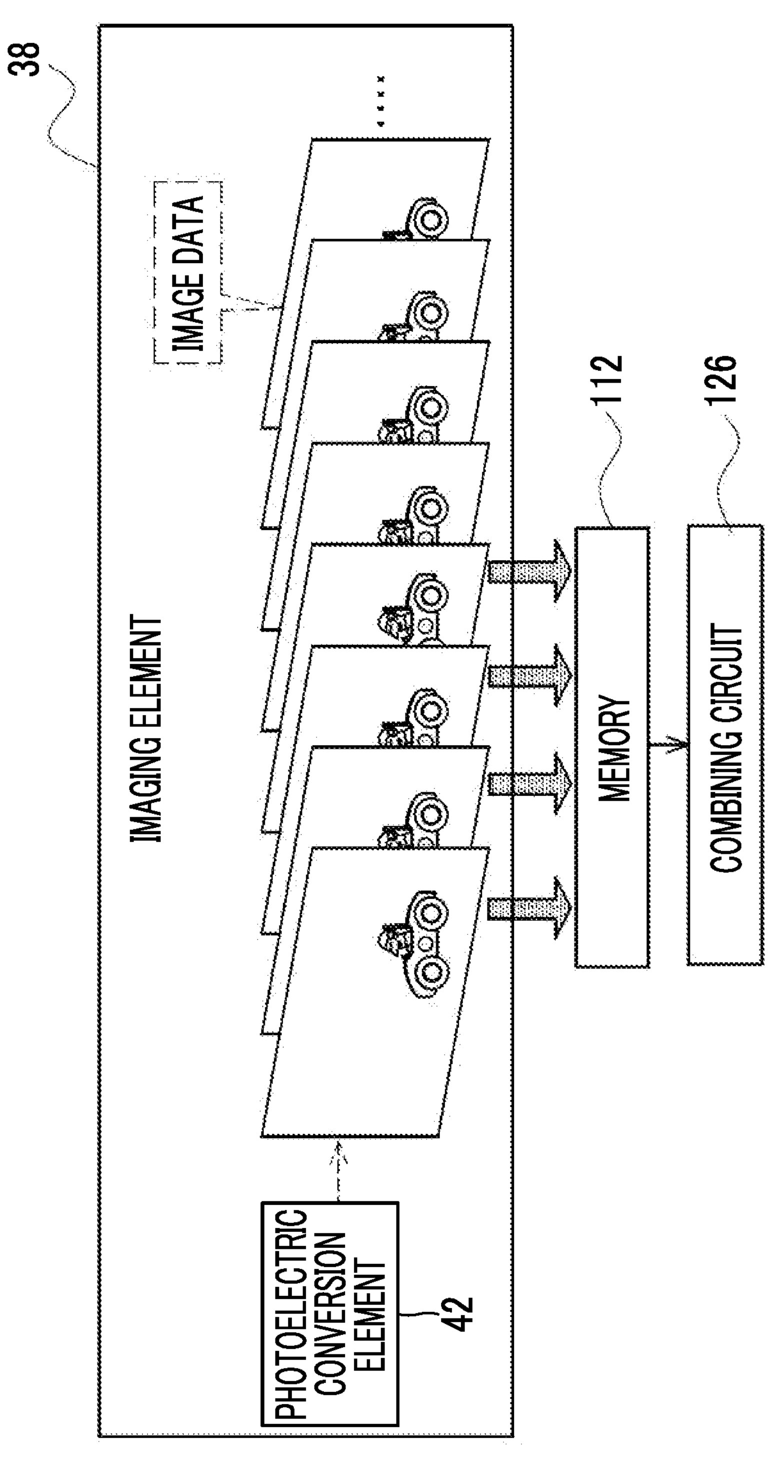
FIG. 19 is a conceptual diagram for describing image combining processing of the imaging element according to the third embodiment.

As illustrated in FIG. 19 as an example, in the imaging element 38, the digital image data 71 is sequentially generated at the first frame rate and stored in the memory 112. In addition, the first thinned-out image data 73 generated from the digital image data 71, the positional information 76, and the partial image data 72 are output from the imaging element 38 at the second frame rate. For example, in a case where the first frame rate is 240 fps, and the second frame rate is 60 fps, the control circuit 119 reads out the continuously generated digital image data 71 of four frames and outputs the digital image data 71 of four frames to the combining circuit 126. The combining circuit 126 creates the combined image data 80 of one frame having high image quality by combining the input digital image data 71 of four frames. The combining circuit 126 stores the generated combined image data 80 in the memory 112 and outputs the combined image data 80 to the first thinning-out circuit 118 and the image cutout circuit 122.

The first thinning-out circuit 118 generates the first thinned-out image data 73 by performing the first thinning-out processing on the input combined image data 80. Details of the first thinning-out processing are the same as the first embodiment and not described in detail. The first thinning-out circuit 118 stores the created first thinned-out image data 73 in the memory 112 and outputs the first thinned-out image data 73 to the positional information acquisition circuit 120.

The positional information acquisition circuit 120 performs the positional information acquisition processing on the input first thinned-out image data 73. The positional information acquisition processing is processing of detecting the image recognition region 75 from an image indicated by the combined image data 80 and generating the positional information 76 indicating the position of the detected image recognition region 75. Details of the positional information acquisition processing are the same as the first embodiment and not described in detail. The positional information acquisition circuit 120 stores the generated positional information 76 in the memory 112 and outputs the positional information 76 to the image cutout circuit 122. The positional information acquisition circuit 120 performs the positional information acquisition processing using the first thinned-out image data 73 created from the combined image data 80 that has less noise and higher image quality than the digital image data 71. Thus, the positional information 76 having high accuracy is detected, compared to the positional information 76 detected based on the first thinned-out image data 73 according to the first embodiment.

The image cutout circuit 122 generates the partial image data 72 by performing the image cutout processing of cutting out the combined image data 80 based on the input positional information 76. The image cutout circuit 122 performs the image cutout processing using the combined image data 80 having higher image quality than the digital image data 71. Thus, the partial image data 72 having higher image quality than the partial image data 72 generated from the digital image data 71 according to the first embodiment is generated.

Furthermore, the partial image data 72 having high image quality is output to the rear stage circuit 13, and the rear stage circuit 13 performs the image recognition processing on the partial image data 72. Thus, the image recognition result having higher accuracy than the image recognition result of the partial image data 72 according to the first embodiment is obtained.

As described above, in the imaging apparatus 10 according to the third embodiment, the combining circuit 126 creates the combined image data 80 of one frame by combining the digital image data 71 of four frames obtained at the first frame rate. The positional information 76 is information obtained from the detection result of the image recognition region 75 by the positional information acquisition circuit 120 with respect to the image indicated by the combined image data 80. Accordingly, the positional information can be obtained with high accuracy, compared to a case where the positional information is obtained from non-combined image data.

In the third embodiment, while the combining circuit 126 creates the combined image data 80 of one frame from the digital image data 71 of four frames, the technology of the present disclosure is not limited thereto. The number of frames of the digital image data used for creating the combined image data of one frame may be any plural number. In addition, the number of frames of the digital image data used for creating the combined image data of one frame may be decided in accordance with a processing speed of the rear stage circuit 13.

Fourth Embodiment

In each of the embodiments, while the processing circuit 110 outputs the first thinned-out image data 73, the positional information 76, and the partial image data 72 to the rear stage circuit 13 at the predetermined second frame rate, the technology of the present disclosure is not limited thereto. In a fourth embodiment, the processing circuit 110 outputs the first thinned-out image data 73, the positional information 76, and the partial image data 72 to the rear stage circuit 13 at a third frame rate decided in accordance with the processing speed of the rear stage circuit 13.

Figure 20:
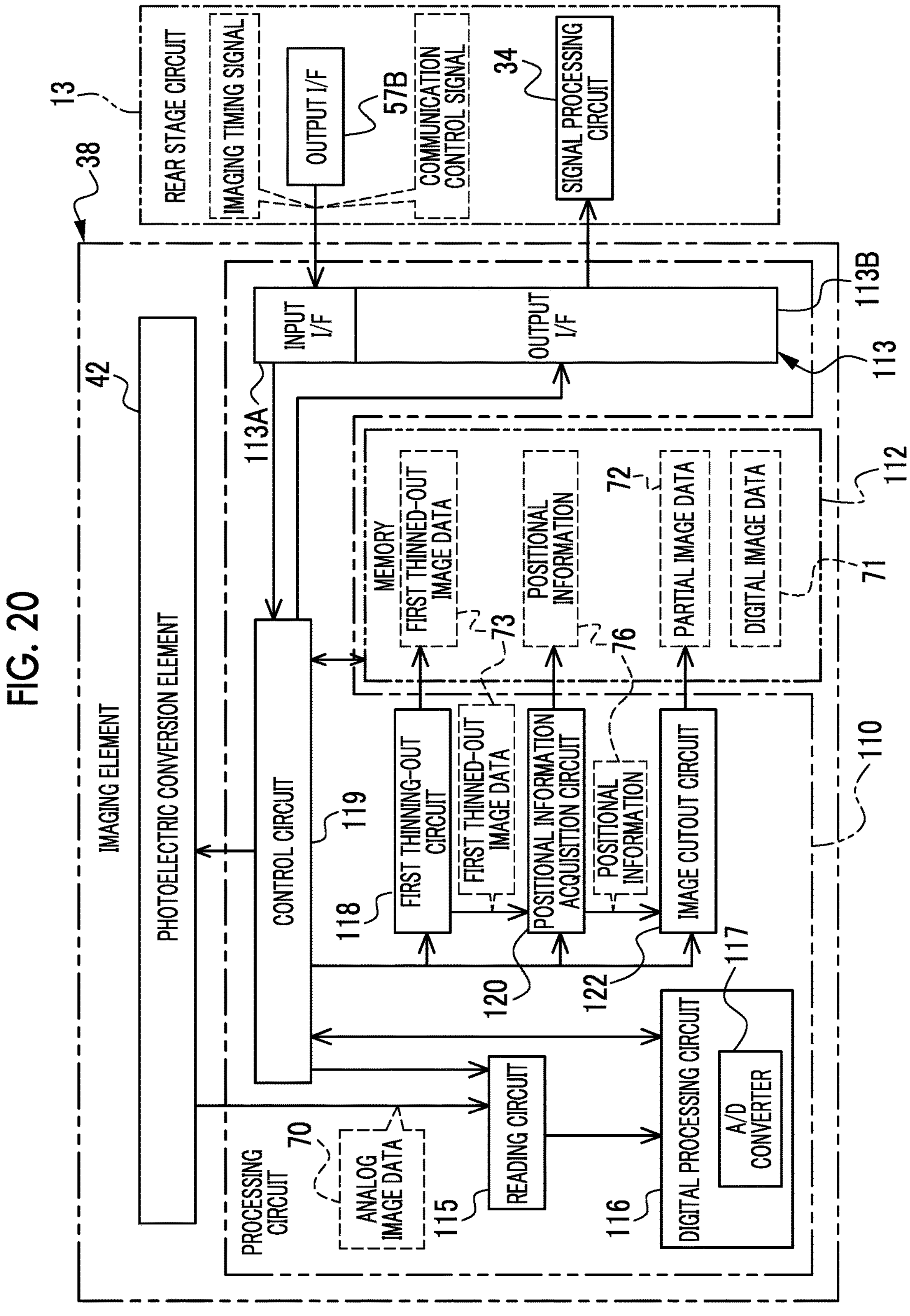
FIG. 20 is a block diagram illustrating an example of a hardware configuration of an electric system of the imaging element included in the imaging apparatus according to the fourth embodiment.

As illustrated in FIG. 20 as an example, the imaging apparatus according to the fourth embodiment has the same configuration as the imaging apparatus 10 according to the first embodiment and thus, is designated by the same reference numeral and not described in detail. In the imaging apparatus 10 according to the fourth embodiment, the CPU 50 outputs a communication control signal to the processing circuit 110 through the input I/F 57A and the output I/F 113B. The communication control signal is a signal for designating frame rates of the first thinned-out image data 73, the positional information 76, and the partial image data 72 output from the processing circuit 110 and is decided in accordance with the processing speed of the rear stage circuit 13.

The processing circuit 110 receives the communication control signal and outputs the first thinned-out image data 73, the partial image data 72, and the positional information 76 at the third frame rate. The third frame rate is a frame rate different from the second frame rate described in each of the examples. As described in each of the examples, the partial image data 72 is data cut out from the digital image data 71 based on the positional information 76 indicating the position of the image recognition region 75. That is, the partial image data 72 is a part of the digital image data 71 and includes the image recognition region 75.

The third frame rate is a frame rate decided in accordance with the processing speed of the rear stage circuit 13. Here, 30 fps is exemplified as a specific example of the third frame rate. However, the technology of the present disclosure is not limited thereto. A frame rate (for example, 60 fps) exceeding 30 fps may be used, or a frame rate (for example, 15 fps) less than 30 fps may be used.

The processing circuit 110 may output the first thinned-out image data 73 at the second frame rate and output the partial image data 72 and the positional information 76 at the third frame rate. That is, the first thinned-out image data 73 is data used for displaying the live view image and thus, is output at a display frame rate of the live view image. Meanwhile, the partial image data 72 and the positional information 76 are data used for the image recognition processing by the rear stage circuit 13 and thus, are output at the frame rate corresponding to the processing speed of the rear stage circuit 13.

As described above, in the imaging apparatus 10 according to the fourth embodiment, the processing circuit 110 outputs the partial image data 72 that is a part of the digital image data 71, and the positional information 76 at the third frame rate different from the second frame rate. An image indicated by the partial image data 72 includes the image recognition region 75, and the third frame rate is decided in accordance with the processing speed of the rear stage circuit 13. Accordingly, since the partial image data 72 and the positional information 76 are output at the frame rate corresponding to the processing speed of the rear stage circuit 13, unnecessary output of the partial image data 72 and the positional information 76 can be reduced, compared to a case where the partial image data 72 and the positional information 76 are output at the second frame rate at all times.

In each of the embodiments, while one image recognition region 75 is detected from the first thinned-out image data 73, and one type of partial image data 72 is created from the digital image data 71, the technology of the present disclosure is not limited thereto. Two or more image recognition regions 75 may be detected, and two or more types of partial image data 72 may be created.

In each of the embodiments, while the positional information acquisition circuit 120 detects the image recognition region 75 using an inter-frame difference method, the technology of the present disclosure is not limited thereto. For example, the positional information acquisition circuit 120 may detect the image recognition region 75 based on a contrast of the image data. In addition, for example, the positional information acquisition circuit 120 may detect the image recognition region 75 by pattern matching. The pattern matching is a method of setting a specific pattern in advance as a pattern of the subject and detecting whether or not the specific pattern is included in the image data. In a case where the contrast or the pattern matching is used, the subject may not be a moving object.

In addition, in each of the embodiments, while the image recognition processing portion 66 performs the image recognition processing using machine learning, the technology of the present disclosure is not limited thereto. For example, the image recognition processing portion 66 may perform the image recognition processing by the pattern matching.

In addition, in the imaging apparatus 10 according to each of the embodiments, the imaging element in which the photoelectric conversion element 42, the processing circuit 110, and the memory 112 are formed in one chip is employed as the imaging element 38. Accordingly, portability of the imaging apparatus 10 is increased, compared to an imaging element in which the photoelectric conversion element 42, the processing circuit 110, and the memory 112 are not formed in one chip. In addition, a degree of design freedom can be increased, compared to a case of the imaging element in which the photoelectric conversion element 42, the processing circuit 110, and the memory 112 are not formed in one chip. Furthermore, it is possible to contribute to size reduction of the imaging apparatus 10, compared to a case of the imaging element in which the photoelectric conversion element 42, the processing circuit 110, and the memory 112 are not formed in one chip.

In addition, in the imaging apparatus 10 according to each of the embodiments, the laminated imaging element in which the photoelectric conversion element 42 is laminated with the memory 112 is employed as the imaging element 38. Accordingly, the transfer speed of the image data from the photoelectric conversion element 42 to the memory 112 can be increased, compared to a case of not laminating the photoelectric conversion element 42 and the memory 112. Improving the transfer speed contributes to high-speed processing in the entire processing circuit. In addition, the degree of design freedom can be increased, compared to a case of not laminating the photoelectric conversion element 42 and the memory 112. Furthermore, it is possible to contribute to the size reduction of the imaging apparatus 10, compared to a case of not laminating the photoelectric conversion element 42 and the memory 112.

In addition, in the imaging apparatus, while the imaging element 38 in which the photoelectric conversion element 42, the processing circuit 110, and the memory 112 are formed in one chip is illustrated as the imaging element, the technology of the present disclosure is not limited thereto. For example, at least the photoelectric conversion element 42 and the memory 112 among the photoelectric conversion element 42, the processing circuit 110, and the memory 112 may be formed in one chip.

In addition, while the imaging apparatus 10 of the interchangeable lens type is illustrated in each of the embodiments, the technology of the present disclosure is not limited thereto. For example, the imaging element 38 and the rear stage circuit 13 described in each of the embodiments may be mounted in a smart device. For example, a smartphone or a tablet terminal that is an electronic apparatus with an imaging function is exemplified as an example of the smart device.

In addition, in each of the embodiments, while an example of a form of incorporating the UI system device 17 in the imaging apparatus main body 12 is illustratively described, at least a part of a plurality of constituents included in the UI system device 17 may be externally attached to the imaging apparatus main body 12. In addition, at least a part of the plurality of constituents included in the UI system device 17 may be used as being connected to the external I/F 104 as a separate body.

In addition, in the embodiments, the first frame rate and/or the second frame rate may be a fixed frame rate or may be a variable frame rate. In a case of the variable frame rate, for example, the frame rate may be changed in a case where a predetermined condition (for example, a condition that an instruction to change the frame rate is received by the reception device 84, and/or a condition that a timing decided in advance as a timing for changing the frame rate is reached) is satisfied. In a case of the variable frame rate, for example, a specific numerical value of the frame rate may be changed in accordance with the instruction received by the reception device 84 or may be changed in accordance with an operation rate of the rear stage circuit 13 and/or the imaging element 38.

Figure 21:
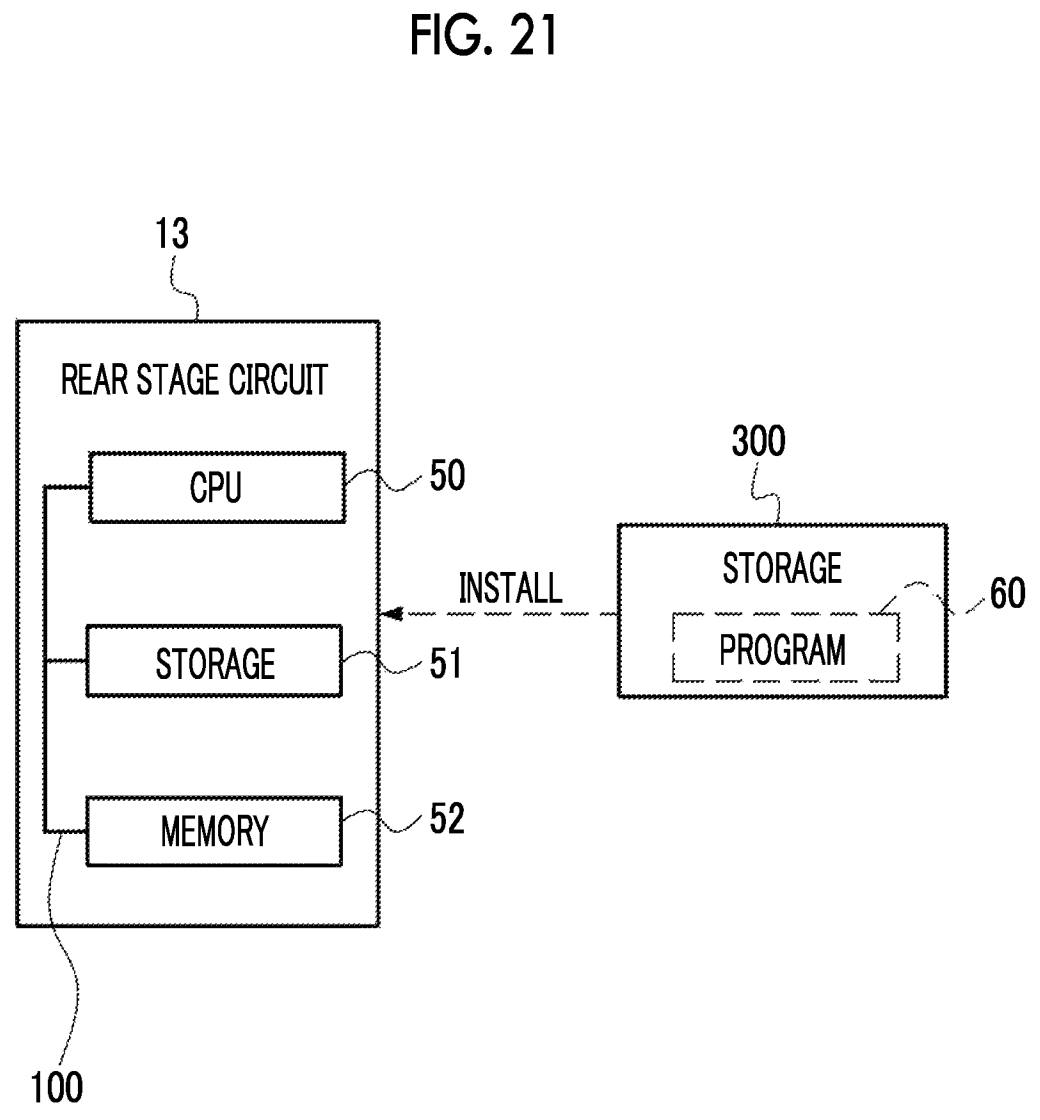

In addition, in each of the embodiments, while the program 60 is stored in the storage 51, and the CPU 50 controls the entire imaging apparatus 10 in accordance with the program 60 executed on the memory 52, the technology of the present disclosure is not limited thereto. As illustrated in FIG. 21 as an example, the program 60 may be stored in a storage 300 (for example, a non-volatile storage device) of another computer, a server apparatus, or the like connected to the imaging apparatus 10 through a communication network (not illustrated), and the program 60 may be downloaded and installed on the imaging apparatus 10 in response to a request of the imaging apparatus 10.

The storage 300 does not need to store the entire program 60 and may store a part of the program 60.

In the example illustrated in FIG. 3, while the CPU 50 is a single CPU, the CPU 50 may include a plurality of CPUs. In addition, a GPU may be applied instead of the CPU 50.

In addition, while an example of a form of implementing the processing circuit 110 by the device including the ASIC and the FPGA is illustratively described in each of the embodiments, the technology of the present disclosure is not limited thereto. For example, at least the control circuit 119 of a plurality of devices included in the processing circuit 110 may be implemented by a software configuration using a computer.

Various processors illustrated below can be used as a hardware resource for executing the second image processing described in each of the embodiments. For example, as described above, a CPU that is a general-purpose processor functioning as the hardware resource for executing the second image processing by executing software, that is, the program, is exemplified as a processor. In addition, a dedicated electric circuit such as an FPGA, a PLD, or an ASIC that is a processor having a circuit configuration dedicatedly designed to execute a specific type of processing is exemplified as a processor. A memory is incorporated in or connected to any of the processors, and any of the processors executes the second image processing using the memory.

The hardware resource for executing the second image processing may be configured with one of the various processors or may be configured with a combination of two or more processors of the same type or different types (for example, a combination of a plurality of FPGAs or a combination of a CPU and an FPGA).

As an example of a configuration with one processor, first, as represented by a computer such as a client and a server, a form in which one processor is configured with a combination of one or more CPUs and software, and in which this processor functions as a hardware resource for executing the second image processing is available. Second, as represented by an SoC or the like, a form of using a processor that implements, by one IC chip, a function of the entire system including a plurality of hardware resources for executing the second image processing is available. In such a manner, the second image processing is implemented using one or more of the various processors as the hardware resource.

Furthermore, as a hardware structure of those various processors, more specifically, an electric circuit in which circuit elements such as semiconductor elements are combined can be used.

In addition, the various types of processing are merely an example. Accordingly, unnecessary steps may be deleted, new steps may be added, or a processing order may be rearranged without departing from a gist of the technology of the present disclosure.

In addition, while the imaging apparatus 10 is illustrated in the example illustrated in FIG. 1, the technology of the present disclosure is not limited thereto. That is, the technology of the present disclosure can be applied to various electronic apparatuses (for example, a fixed lens camera, a personal computer, a wearable terminal apparatus or the like) incorporating the imaging apparatus having configurations and functions corresponding to the imaging apparatus main body 12 described in each of the embodiments. Even with these electronic apparatuses, the same actions and effects as the imaging apparatus 10 are obtained.

In addition, while the display 26 is illustrated in each of the embodiments, the technology of the present disclosure is not limited thereto. For example, a separate display that is retrofit into the imaging apparatus may be used.

Fifth Embodiment

An imaging system to which the imaging apparatus according to the embodiments of the technology of the present disclosure is applied will be described as a fifth embodiment.

Figure 22:
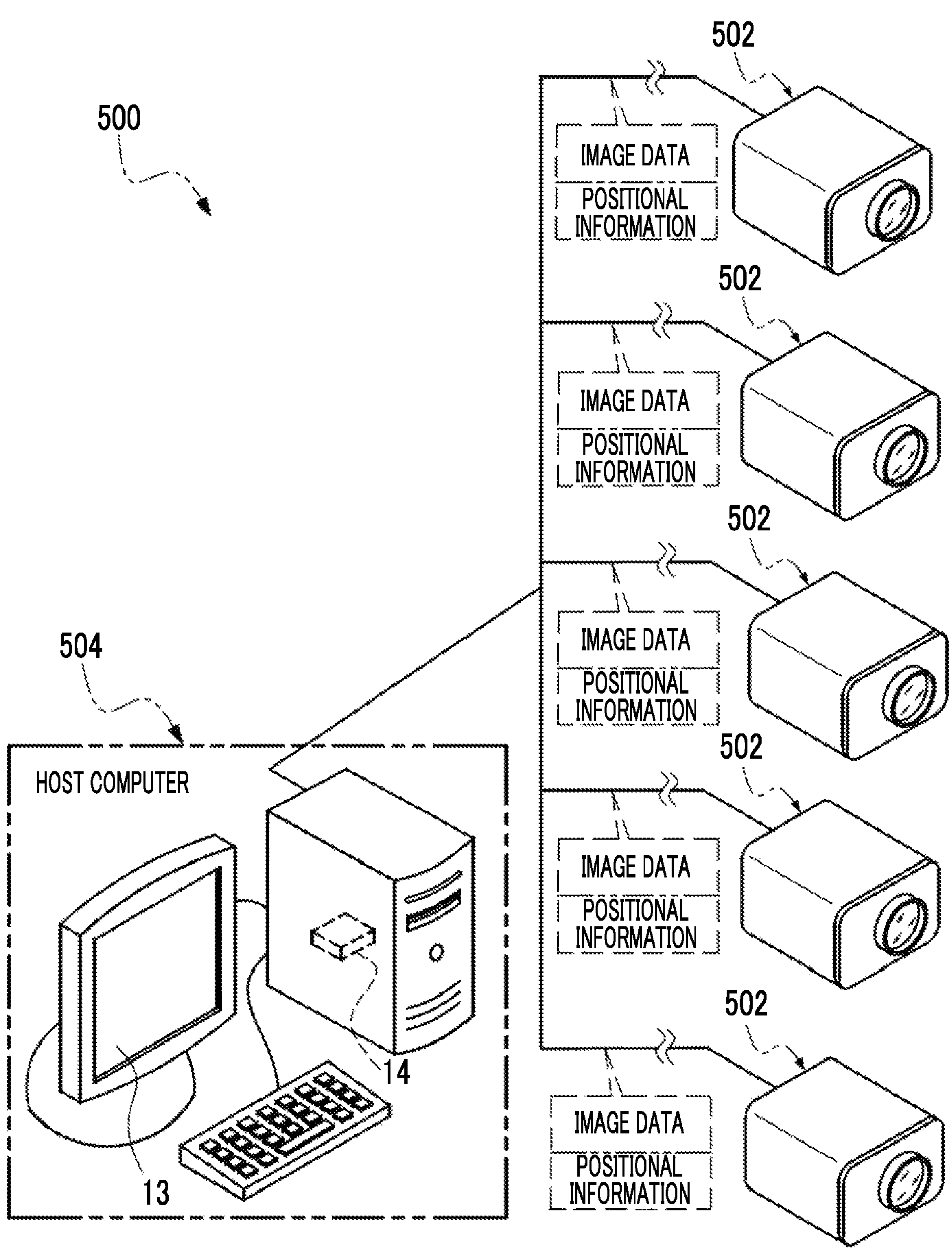
FIG. 22 is a perspective view illustrating an example of an exterior of a surveillance camera according to a fifth embodiment.

As illustrated in FIG. 22 as an example, an imaging system 500 is used as, for example, a surveillance camera. The imaging system 500 comprises a plurality of imaging apparatuses 502 and a host computer 504. The imaging apparatuses 502 include the imaging apparatus main body 12 disclosed in any one of the first to fourth embodiments. Each imaging apparatus 502 includes a memory that stores image data obtained by imaging, and a processor configured to output the image data.

The processor is configured to acquire positional information indicating a position of an image recognition region from the image data. The image recognition region is a region set as a processing target of image recognition processing performed by the host computer 504. The image recognition processing is described in the first embodiment and thus, not described in detail. The processor is configured to output the image data and the acquired positional information to the host computer 504.

The host computer 504 receives the image data and the positional information from each imaging apparatus. The host computer 504 performs the image recognition processing on the image recognition region of the image data based on the positional information.

As described above, the imaging system 500 according to the fifth embodiment comprises the plurality of imaging apparatuses 502 each including the memory that stores the image data obtained by imaging, and the processor configured to output the image data, and the host computer 504 into which the image data is input from the processor. The processor is configured to acquire the positional information indicating the position of the image recognition region set as the processing target of the image recognition processing in the image data. The host computer 504 performs the image recognition processing on the image recognition region based on the positional information. Accordingly, it is possible to reduce a processing load exerted on the image recognition processing and increase a processing speed compared to a case where the host computer 504 does not perform the image recognition processing based on the positional information.

In each of the embodiments, while the input-output I/F 113 included in the processing circuit 110 disposed in the imaging element 38 is connected to the input I/F 57A and the output I/F 57B included in the controller 15 of the rear stage circuit 13 in accordance with the PCIe connection standard, the technology of the present disclosure is not limited thereto. Instead of the PCIe connection standard, other connection standards such as LVDS, SATA, SLVS-EC, or MIPI may be employed as a high-speed communication standard. In addition, similarly, the input-output I/F 113 included in the processing circuit 110 disposed in the imaging element 38 is connected to an input-output I/F (not illustrated) included in the signal processing circuit 34 using a high-speed communication standard such as PCIe, LVDS, SATA, SLVS-EC, or MIPI.

In each of the embodiments, while the USB interface is employed as the external I/F 104, the technology of the present disclosure is not limited thereto. For example, hardware interfaces of other types such as HDMI and/or a wireless interface such as Wi-Fi (registered trademark) may be employed.

In each of the embodiments, both of communication between the imaging element 38 and the rear stage circuit 13 and communication between the imaging apparatuses 502 and the host computer 504 are wired communication. However, the technology of the present disclosure is not limited thereto. The communication between the imaging element 38 and the rear stage circuit 13 and the communication between the imaging apparatuses 502 and the host computer 504 may be wireless communication.

Above described contents and illustrated contents are detailed description for parts according to the embodiment of the technology of the present disclosure and are merely an example of the technology of the present disclosure. For example, description related to the above configurations, functions, actions, and effects is description related to an example of configurations, functions, actions, and effects of the parts according to the embodiments of the technology of the present disclosure. Thus, unnecessary parts may be deleted, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiment of the technology of the present disclosure.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

What is claimed is:

1. An imaging element comprising:

a memory which stores image data obtained by imaging at a first frame rate, and a first processor configured to output the image data from the imaging element at a second frame rate independent of the first frame rate;

wherein the first processor is configured to:

acquire positional information indicating a position of an image recognition region set as a processing target of image recognition processing in the image data, generate, based on the positional information, partial image data that is a part of the image data and includes the image recognition region, and associate the positional information with the partial image data, and output, from the imaging element, the partial image data and the positional information at the second frame rate.

2. The imaging element according to claim 1, wherein the positional information is coordinates indicating the position of the image recognition region in the image data.

3. The imaging element according to claim 1, wherein the first processor is configured to detect the image recognition region from the image data based on a difference between frames of the image data and acquire the positional information based on a detection result.

4. The imaging element according to claim 1, wherein the partial image data includes only the image recognition region.

5. The imaging element according to claim 1, wherein the first processor is configured to output thinned-out image data obtained by thinning out the image data, the partial image data, and the positional information at the second frame rate.

6. The imaging element according to claim 1, wherein the positional information is information obtained from a detection result of the image recognition region by the first processor with respect to first thinned-out image data obtained by thinning out the image data at a first thinning-out rate.

7. The imaging element according to claim 1, wherein the first processor is configured to create combined image data of one frame by combining image data of a plurality of frames obtained at the first frame rate, and the positional information is information obtained from a detection result of the image recognition region by the first processor with respect to an image indicated by the combined image data.

8. The imaging element according to claim 1, wherein the imaging element is an imaging element in which at least a photoelectric conversion element and the memory are formed in one chip.

9. The imaging element according to claim 8, wherein the imaging element is a laminated imaging element in which the photoelectric conversion element and the memory are laminated.

10. An operation method of an imaging element comprising a memory which stores image data obtained by imaging at a first frame rate, and a processor configured to output the image data from the imaging element at a second frame rate independent of the first frame rate, the operation method comprising:

acquiring, by the processor, positional information indicating a position of an image recognition region set as a processing target of image recognition processing in the image data;

generating, based on the positional information, partial image data that is a part of the image data and includes the image recognition region, and associating the positional information with the partial image data, and outputting, by the processor, the partial image data and the positional information at the second frame rate.

11. A non-transitory computer-readable storage medium storing a program executable by a computer to perform a process, the computer controlling an imaging element comprising a memory which stores image data obtained by imaging at a first frame rate, and a processor configured to output the image data from the imaging element at a second frame rate independent of the first frame rate, the process comprising:

acquiring, by the processor, positional information indicating a position of an image recognition region set as a processing target of image recognition processing in the image data;

generating, based on the positional information, partial image data that is a part of the image data and includes the image recognition region, and associating the positional information with the partial image data, and outputting, by the processor, the partial image data and the positional information at the second frame rate.

12. An imaging system comprising:

a plurality of imaging elements, each imaging element comprising a memory which stores image data obtained by imaging at a first frame rate, and a processor configured to output the image data from the imaging element at a second frame rate independent of the first frame rate; and a host computer that is configured to receive an input of the image data from the processor, wherein the processor is configured to:

acquire positional information indicating a position of an image recognition region set as a processing target of image recognition processing in an image indicated by the image data, generate, based on the positional information, partial image data that is a part of the image data and includes the image recognition region, and associate the positional information with the partial image data and output the partial image data and the positional information at the second frame rate.

* * * * *